United States Patent
Mielczarek et al.

(10) Patent No.: US 10,797,763 B2
(45) Date of Patent: ***Oct. 6, 2020

(54) QUANTIZATION OF CHANNEL STATE INFORMATION IN MULTIPLE ANTENNA SYSTEMS

(71) Applicant: Wi-LAN Inc., Ottawa (CA)

(72) Inventors: Bartosz Mielczarek, Edmonton (CA); Witold A. Krzymien, Edmonton (CA)

(73) Assignee: WI-LAN INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,532

(22) Filed: Jun. 10, 2019

(65) Prior Publication Data

US 2019/0326961 A1 Oct. 24, 2019

Related U.S. Application Data

(60) Continuation of application No. 14/628,570, filed on Feb. 23, 2015, now Pat. No. 10,320,453, which is a
(Continued)

(51) Int. Cl.
 *H04B 7/0452* (2017.01)
 *H04B 7/0426* (2017.01)
 (Continued)

(52) U.S. Cl.
 CPC ......... *H04B 7/0452* (2013.01); *H04B 7/0434* (2013.01); *H04B 7/0456* (2013.01);
 (Continued)

(58) Field of Classification Search
 CPC .. H04B 7/0452; H04B 7/0434; H04B 7/0456; H04B 7/0478; H04B 7/0617;
 (Continued)

(56) References Cited

U.S. PATENT DOCUMENTS 5,706,312 A 1/1998 Wei
5,790,676 A 8/1998 Ganesan et al.
(Continued)

FOREIGN PATENT DOCUMENTS

CA 2 548 919 6/2005
CN 101136718 3/2008
(Continued)

OTHER PUBLICATIONS

Balachandran et al., "Channel Quality Estimation and Rate Adaptation for Cellular Mobile Radio," IEEE Journal on Selected Areas in Communication 17(7):1244-1256 (Jul. 1999).
(Continued)

*Primary Examiner* — Hirdepal Singh
(74) *Attorney, Agent, or Firm* — Volpe and Koenig, P.C.

(57) ABSTRACT

A method of transmission over multiple wireless channels in a multiple antenna system includes storing channel modulation matrices at a transmitter; receiving quantized channel state information at the transmitter from plural receivers; selecting a transmission modulation matrix using the quantized channel state information from the stored channel modulation matrices; and transmitting over the multiple channels to the plural receivers using the selected transmission modulation matrix. In another embodiment, the method includes storing, at one or more receivers, indexes of modulation matrices generated by a capacity enhancing algorithm; upon a selected one of the one or more receivers receiving a transmission from the transmitter, the selected receiver selecting a modulation matrix from the stored modulation matrices that optimizes transmission between the transmitter and the selected receiver; the selected receiver sending an index representing the selected modulation matrix; and receiving the index at the transmitter from the selected receiver.

21 Claims, 16 Drawing Sheets

Related U.S. Application Data continuation of application No. 13/289,957, filed on Nov. 4, 2011, now Pat. No. 8,971,467, which is a division of application No. 11/754,965, filed on May 29, 2007, now Pat. No. 8,116,391.

(60) Provisional application No. 60/808,806, filed on May 26, 2006.

(51) Int. Cl.
| | | |
|---|---|---|
| *H04B 7/06* | (2006.01) | |
| *H04L 1/00* | (2006.01) | |
| *H04L 1/06* | (2006.01) | |
| *H04L 25/02* | (2006.01) | |
| *H04B 7/0456* | (2017.01) | |

(52) U.S. Cl.
CPC ........... *H04B 7/066* (2013.01); *H04B 7/0617* (2013.01); *H04B 7/0632* (2013.01); *H04B 7/0658* (2013.01); *H04L 1/003* (2013.01); *H04L 1/0029* (2013.01); *H04L 1/0687* (2013.01); *H04L 1/0693* (2013.01); *H04L 25/0206* (2013.01); *H04B 7/0478* (2013.01)

(58) Field of Classification Search
CPC .... H04B 7/0632; H04B 7/0658; H04B 7/066; H04L 1/0029; H04L 1/003; H04L 1/0687; H04L 1/0693; H04L 25/0206
USPC ........................................................ 375/267
See application file for complete search history.

(56) References Cited

U.S. PATENT DOCUMENTS

| | | | |
|---|---|---|---|
| 6,952,671 B1 | 10/2005 | Kolesnik et al. | |
| 7,333,556 B2 | 2/2008 | Maltsev | |
| 7,489,664 B2 | 2/2009 | Kim et al. | |
| 7,570,627 B2 | 8/2009 | Welborn | |
| 7,587,172 B2 | 9/2009 | Kim et al. | |
| 7,599,714 B2 | 10/2009 | Kuzminsky | |
| 7,613,244 B2* | 11/2009 | Hwang | H04W 99/00 |
| | | | 375/219 |
| 7,676,007 B1 | 3/2010 | Choi et al. | |
| 7,702,029 B2 | 4/2010 | Kotecha | |
| 2003/0012290 A1 | 1/2003 | Fimoff et al. | |
| 2003/0017835 A1 | 1/2003 | Bergel | |
| 2003/0144032 A1 | 7/2003 | Brunner et al. | |
| 2004/0057394 A1 | 3/2004 | Holtzman | |
| 2004/0190636 A1 | 9/2004 | Oprea | |
| 2004/0259555 A1 | 12/2004 | Rappaport et al. | |
| 2005/0047517 A1* | 3/2005 | Georgios | H04B 7/0417 |
| | | | 375/267 |
| 2005/0195912 A1 | 9/2005 | Kim | |
| 2005/0259764 A1 | 11/2005 | Lai et al. | |
| 2005/0286618 A1 | 12/2005 | Abe | |
| 2005/0286663 A1 | 12/2005 | Poon | |
| 2006/0008021 A1 | 1/2006 | Bonnet | |
| 2006/0019602 A1 | 1/2006 | Ionescu et al. | |
| 2006/0034165 A1 | 2/2006 | Levy | |
| 2006/0039489 A1 | 2/2006 | Ikram | |
| 2006/0056531 A1 | 3/2006 | Li et al. | |
| 2006/0111148 A1 | 5/2006 | Mukkavilli | |
| 2006/0155534 A1 | 7/2006 | Lin | |
| 2006/0165008 A1 | 7/2006 | Li et al. | |
| 2006/0215780 A1 | 9/2006 | Yeon et al. | |
| 2006/0233265 A1 | 10/2006 | Rajan et al. | |
| 2006/0268623 A1 | 11/2006 | Chae | |
| 2007/0064780 A1 | 3/2007 | Zheng et al. | |
| 2007/0104283 A1 | 5/2007 | Han et al. | |
| 2007/0120670 A1 | 5/2007 | Torchalski | |
| 2007/0153731 A1 | 7/2007 | Fine | |
| 2007/0160011 A1* | 7/2007 | Kim | H04B 7/043 |
| | | | 370/332 |
| 2007/0191066 A1 | 8/2007 | Khojastepour et al. | |
| 2007/0211813 A1* | 9/2007 | Talwar | H04B 7/0626 |
| | | | 375/267 |
| 2007/0211823 A1* | 9/2007 | Mazzarese | H04B 7/0452 |
| | | | 375/299 |
| 2007/0254602 A1 | 11/2007 | Li et al. | |
| 2008/0037669 A1 | 2/2008 | Pan et al. | |
| 2008/0080449 A1 | 4/2008 | Huang | |
| 2008/0080459 A1 | 4/2008 | Kotecha | |
| 2008/0084943 A1 | 4/2008 | Jung et al. | |
| 2008/0086669 A1 | 4/2008 | Cheng et al. | |
| 2008/0101321 A1 | 5/2008 | Cheng et al. | |
| 2008/0165875 A1 | 7/2008 | Mudarath et al. | |
| 2008/0165876 A1 | 7/2008 | Suh et al. | |
| 2008/0192717 A1 | 8/2008 | Kent et al. | |
| 2008/0219369 A1 | 9/2008 | Wu et al. | |
| 2008/0232274 A1 | 9/2008 | Grover | |
| 2008/0268862 A1 | 10/2008 | Kent | |
| 2008/0285670 A1 | 11/2008 | Walton | |
| 2009/0067512 A1 | 3/2009 | Mielczarek | |
| 2009/0067529 A1 | 3/2009 | Mielczarek et al. | |
| 2009/0075686 A1* | 3/2009 | Gomadam | H04B 7/0417 |
| | | | 455/500 |
| 2009/0201861 A1 | 8/2009 | Kotecha | |
| 2009/0265601 A1 | 10/2009 | Mielczarek | |
| 2009/0274230 A1 | 11/2009 | Heath et al. | |
| 2009/0323773 A1 | 12/2009 | Bala et al. | |
| 2010/0046666 A1 | 2/2010 | Ketchum | |
| 2010/0150036 A1 | 6/2010 | Zheng | |
| 2010/0232525 A1 | 9/2010 | Xia et al. | |
| 2010/0266054 A1 | 10/2010 | Mielczarek | |
| 2010/0322336 A1 | 12/2010 | Nabar | |
| 2012/0057643 A1 | 3/2012 | Lin | |
| 2012/0120823 A1* | 5/2012 | Kotecha | H04L 1/0029 |
| | | | 370/252 |
| 2014/0064415 A1 | 3/2014 | Hultell et al. | |
| 2014/0126663 A1 | 5/2014 | Cheng et al. | |

FOREIGN PATENT DOCUMENTS

| | | |
|---|---|---|
| WO | 2005/057812 | 6/2005 |
| WO | 2005/081439 | 9/2005 |
| WO | 2005/125044 | 12/2005 |
| WO | 2007/007249 | 1/2007 |
| WO | 2007/066936 | 6/2007 |
| WO | 2007/094832 | 8/2007 |

OTHER PUBLICATIONS

Bulumulla et al., "A Systemic Approach to Detecting OFDM Signals in a Fading Channel," IEEE Transactions on Communications 48(5):725-728 (May 2000).

Caire et al., "Multiuser MIMO Achievable Rates with Downlink Training and Channel State Feedback," IEEE Transactions on Information Theory 56(6):2845-2866 (Jun. 2010).

IEEE Standard for Local and metropolitan area networks; Part 16: Air Interface for Fixed Broadband Wireless Access Systems, IEEE Std 802.16-2004 (Oct. 1, 2004).

IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Std 802.16e-2005 and IEEE Std 802.16-2004/Cor1-2005 (Feb. 2006).

Jindal, "MIMO Broadcast Channels with Digital Channel Feedback," 40th Asilomar Conference on Signals, Systems and Computers (ACSSC '06), Pacific Grove, Calif., pp. 1506-1510 (Oct. 29-Nov. 1, 2006).

Larsson et al., "Off-line dictionary-based compression," Proceedings of the IEEE, vol. 88, Issue 11, pp. 1722-1732 (Nov. 2000).

Li et al., "Test Data Compression Using Dictionaries with Fixed-Length Indices," Proceedings of the VLSI Test Symposium (Apr. 27-May 1, 2003).

Mielczarek et al., "Flexible Channel Feedback Quantization in Multiple Antenna Systems," IEEE 61st Vehicular Technology Conference, Stockholm, vol. 1, pp. 620-624 (May 30-Jun. 1, 2005).

(56) References Cited

OTHER PUBLICATIONS

Mielczarek et al., "Influence of CSI Feedback Delay on Capacity of Linear Multi-User MIMO Systems," IEEE Wireless Communications and Networking Conference, Hong Kong, pp. 1189-1192 (Mar. 11-15, 2007).

Mielczarek et al., "Influence of SCI Feedback Errors on Capacity of Linear Multi-User MIMO Systems," IEEE 65th Vehicular Technology Conference, Dublin, Ireland, pp. 2043-2047 (Apr. 22-25, 2007).

Mielczarek et al., "Quantized CSI Prediction in Linear Multi-User MIMO Systems," IEEE 67th Vehicular Technology Conference, Singapore, pp. 852-857 (May 11-14, 2008).

Mielczarek et al., "Vector Quantization of Channel Information in Linear Multi-User MIMO Systems," IEEE Ninth International Symposium on Spread Spectrum Techniques and Applications, Manaus, Brazil, pp. 302-306 (Aug. 28-31, 2006).

Raghavan et al., "Systemic Codebook Designs for Quantized Beamforming in Correlated MIMO Channels," IEEE Journal on Selected Areas in Communication 25(7):1298-1310 (Sep. 2007).

Ravindran et al., "MIMO Broadcast Channels with Block Diagonalization and Finite Rate Feedback," IEEE International Conference on Acoustics, Speech and Signal Processing, Honolulu, pp. III-13-III-16 (Apr. 2007).

Ravindran et al., "MIMO Broadcast Channels with Block Diagonalization and Finite Rate Feedback," Computing Research Repository—CORR, arXiv:cs/0610077v1, 4 pages (Oct. 2006).

Roh et al., "Channel Feedback Quantization Methods for MISO and MIMO Systems," 15th IEEE International Symposium on Personal, Indoor, and Mobile Radio Communications, Barcelona, Spain, vol. 2, pp. 805-809 (Sep. 5-8, 2004).

Sadrabadi et al., "A New Method of Channel Feedback Quantization for High Data Rate MIMO Systems," Technical Report UW-E &CE#2004-05, Coding & Signal Transmission Laboratory, Dept. of Electrical & Computer Engineering, University of Waterloo, Waterloo, Canada, 23 pages (Mar. 20, 2004).

Sadrabadi et al., "A New Method of Channel Feedback Quantization for High Data Rate MIMO Systems," IEEE Global Telecommunications Conference, Dallas, Texas, vol. 1, pp. 91-95 (Nov. 29-Dec. 3, 2004).

Zorzi et al., "Lateness Probabliity of a Retransmission Scheme for Error Control on a Two-State Markov Channel," IEEE Transactions on Communications, 47(10):1537-1548 (Oct. 1999).

* cited by examiner

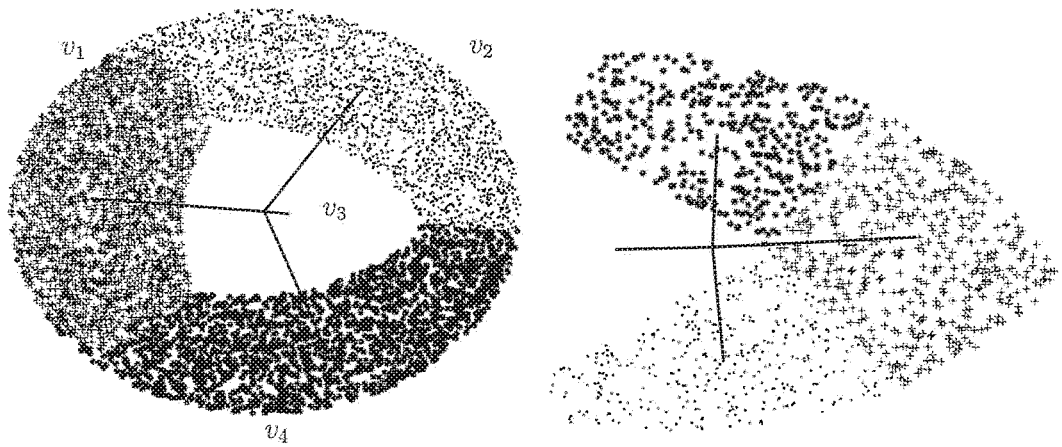
*FIG. 16A*  *FIG. 16B*
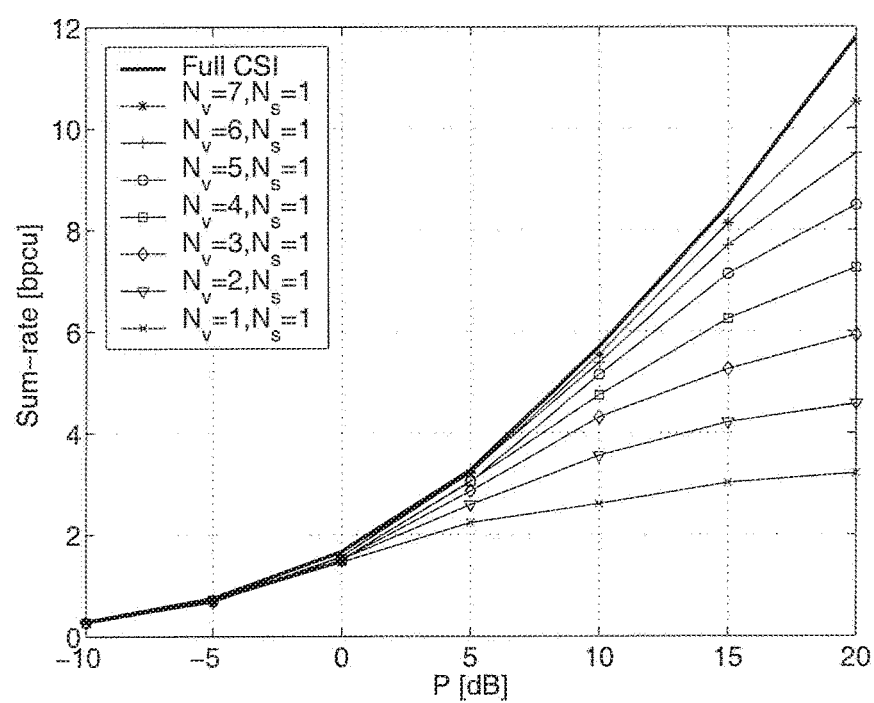
*FIG. 17*

QUANTIZATION OF CHANNEL STATE INFORMATION IN MULTIPLE ANTENNA SYSTEMS

CROSS-REFERENCES TO RELATED APPLICATIONS

This application is a continuation of U.S. application Ser. No. 14/628,570, filed Feb. 23, 2015, which is a continuation of U.S. application Ser. No. 13/289,957, filed Nov. 4, 2011, now U.S. Pat. No. 8,971,467, issued Mar. 3, 2015, which is a division of U.S. application Ser. No. 11/754,965, filed May 29, 2007, now U.S. Pat. No. 8,116,391 issued Feb. 14, 2012, which claims the benefits under 35 U.S.C. § 119(e) of U.S. Provisional Patent Application No. 60/808,806, filed May 25, 2006, the entire disclosure of which is incorporated herein by reference.

BACKGROUND

The development of the modern Internet-based data communication systems and ever increasing demand for bandwidth have spurred an unprecedented progress in development of high capacity wireless systems. The major trends in such systems design are the use of multiple antennas to provide capacity gains on fading channels and orthogonal frequency division multiplexing (OFDM) to facilitate the utilization of these capacity gains on rich scattering frequency-selective channels. Since the end of the last decade, there has been an explosion of interest in multiple-input multiple-output systems (MIMO) and a lot of research work has been devoted to their performance limits and methods to achieve them.

One of the fundamental issued in multiple antenna systems is the availability of the channel state information at transmitter and receiver. While it is usually assumed that the perfect channel state information (CSI) is available at the receiver, the transmitter may have perfect, partial or no CSI. In case of the single user systems, the perfect CSI at the transmitter (CSIT) allows for use of a spatial water-filling approach to achieve maximum capacity. In case of multi-user broadcast channels (the downlink), the capacity is maximized by using the so called dirty paper coding, which also depends on the availability of perfect CSIT. Such systems are usually refereed to as closed-loop as opposed to open-loop systems where there is no feedback from the receiver and the transmitter typically uses equal-power division between the antennas.

In practice, the CSI should be quantized to minimize feedback rate while providing satisfactory performance of the system. The problem has attracted attention of the community and papers provided solutions for beamforming on flat-fading MIMO channels where the diversity gain is the main focus. Moreover, some authors dealt with frequency-selective channels and OFDM modulation although also those papers were mainly devoted to beamforming approach.

Unfortunately, availability of full CSIT is unrealistic due to the feedback delay and noise, channel estimation errors and limited feedback bandwidth, which forces CSI to be quantized at the receiver to minimize feedback rate. The problem has attracted attention of the scientific community and papers have provided solutions for single-user beamforming on flat-fading MIMO channels, where the diversity gain is the main focus. More recently, CSI quantization results were shown for multi-user zero-forcing algorithms by Jindal.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

We present a simple, flexible algorithm that is constructed with multiplexing approach to MIMO transmission, i.e., where the channel is used to transmit multiple data streams. We use a vector quantizer approach to construct code-books of water-filling covariance matrices which can be used in a wide variety of system configurations and on frequency selective channels. Moreover, we propose a solution which reduces the required average feedback rate by transmitting the indexes of only those covariance matrices which provide higher instantaneous capacity than the equal power allocation.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

Embodiments will now be described with reference to the figures, in which like reference characters denote like elements, by way of example, and in which:

FIG. 11A shows V̂ for $N_v$=2 and FIG. 11B shows Ŝ for $N_s$=1.

FIGS. 16A and 16B show an example of the nested quantization of eigenmodes. The thick lines symbolize centroids v̂(i) of the respective regions $v_i$. FIG. 16A shows a coarse 2-bit quantizer and FIG. 16B shows a precise 2-bit quantizer of $v_3$.

FIG. 17 shows linear system sum-rates with full CSIT and varying feedback bit-rate for K=2. $n_T$=2 and all users with $n_R$=2 antennas.

DETAILED DESCRIPTION

Figure 1:
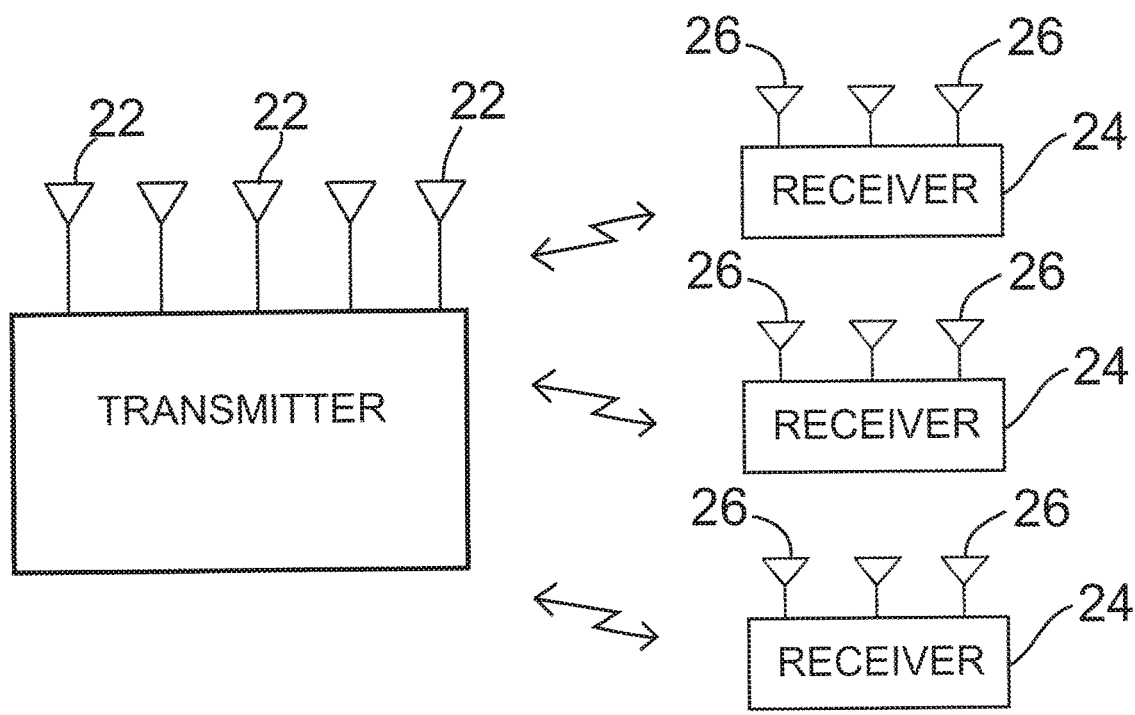
FIG. 1 shows a typical transmission system.
Figure 2:
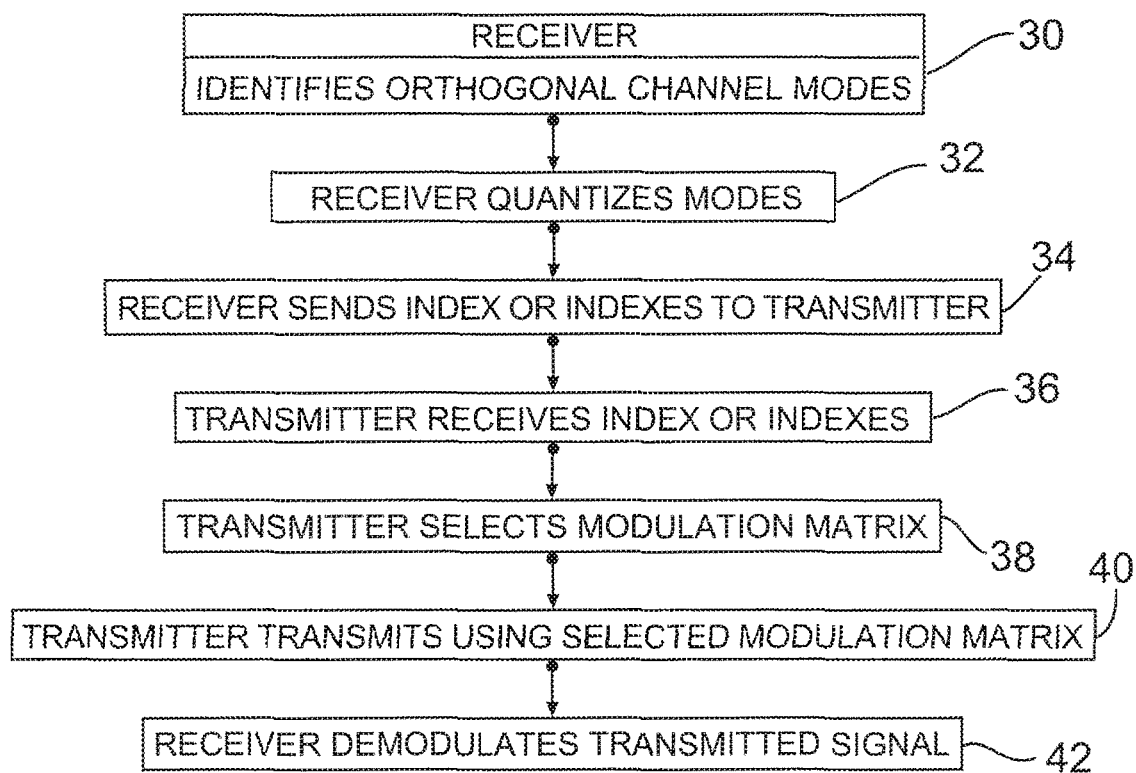
FIG. 2 is a flow diagram showing basic system operation.
Figure 3:
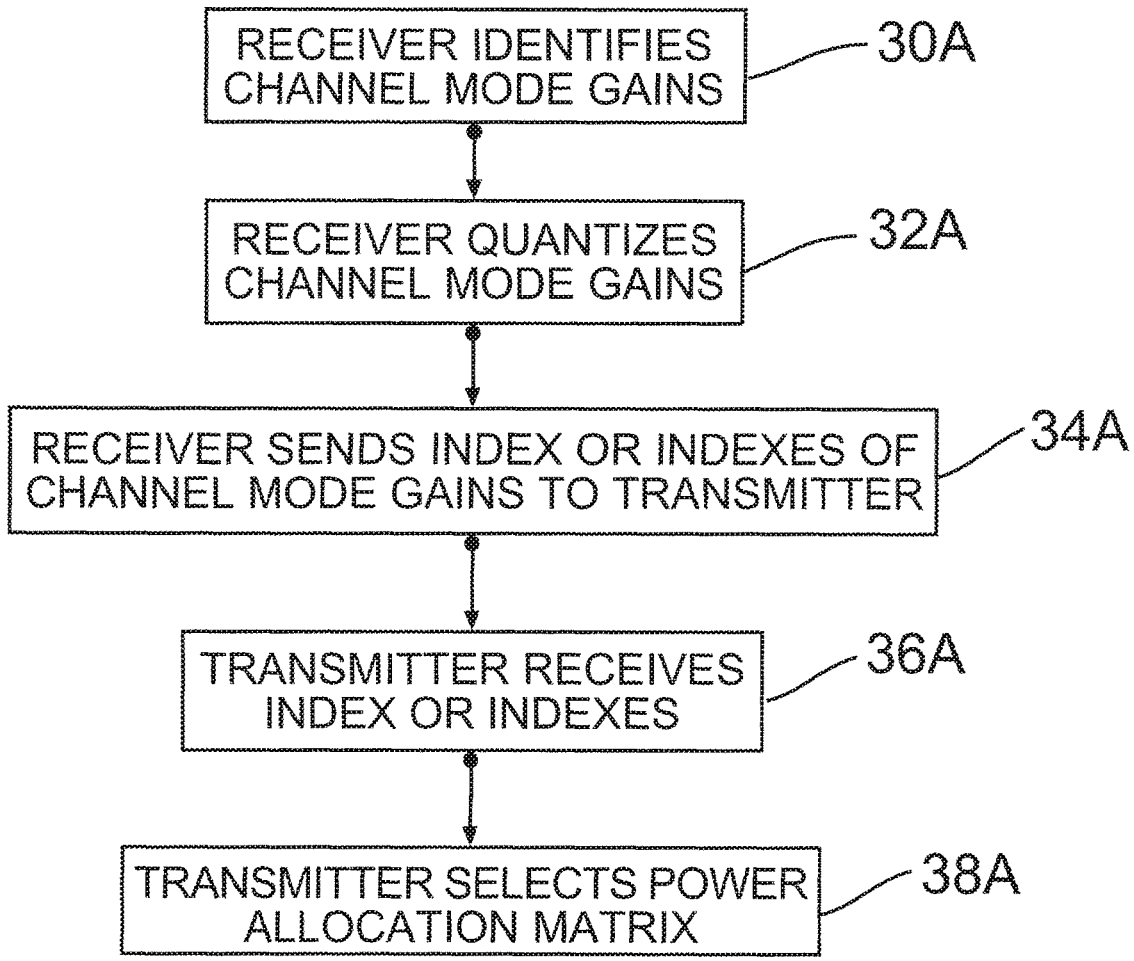
FIG. 3 is a flow diagram showing use of quantized mode gain in the system of FIG. 1.
Figure 4A:
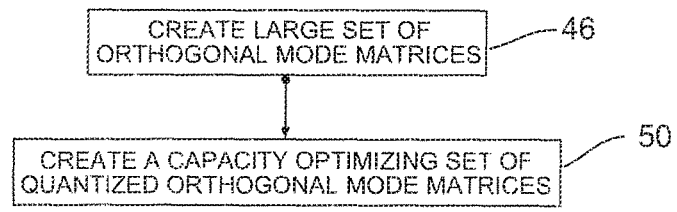
FIG. 4a is a flow diagram showing design of optimized orthogonal mode matrices for use in the system of FIG. 1 for single user case.
Figure 4B:
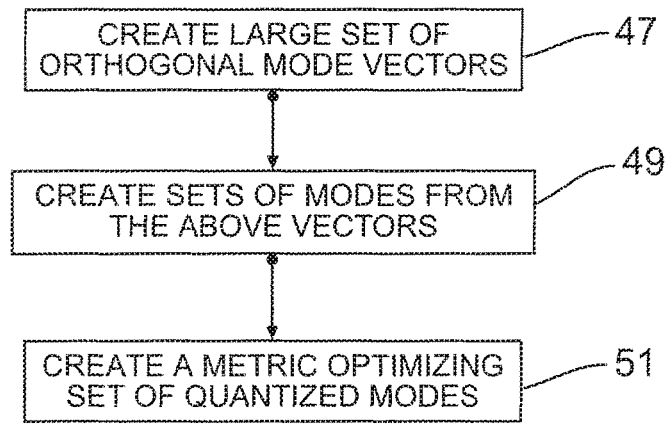
FIG. 4b is a flow diagram showing design of optimized orthogonal modes for use in the system of FIG. 1 for a multi user system.
Figure 5:
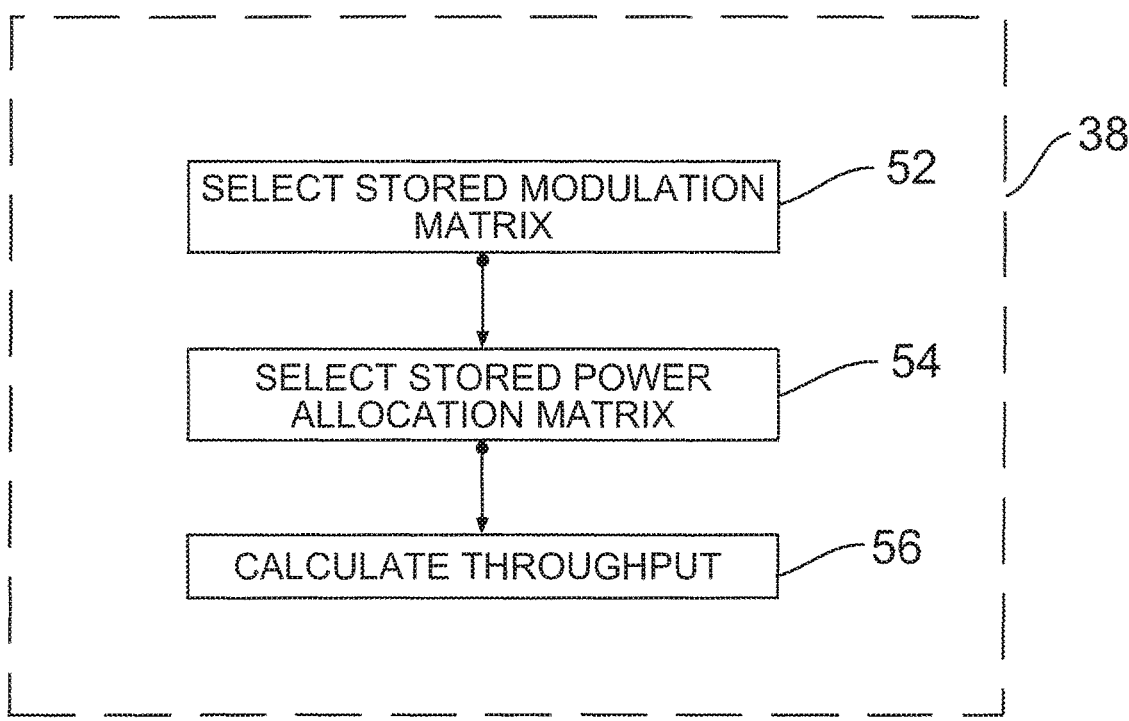
FIG. 5 is a flow diagram showing an embodiment of calculation of throughput at the transmitter in the system of FIG. 1 for single user case.
Figure 6:
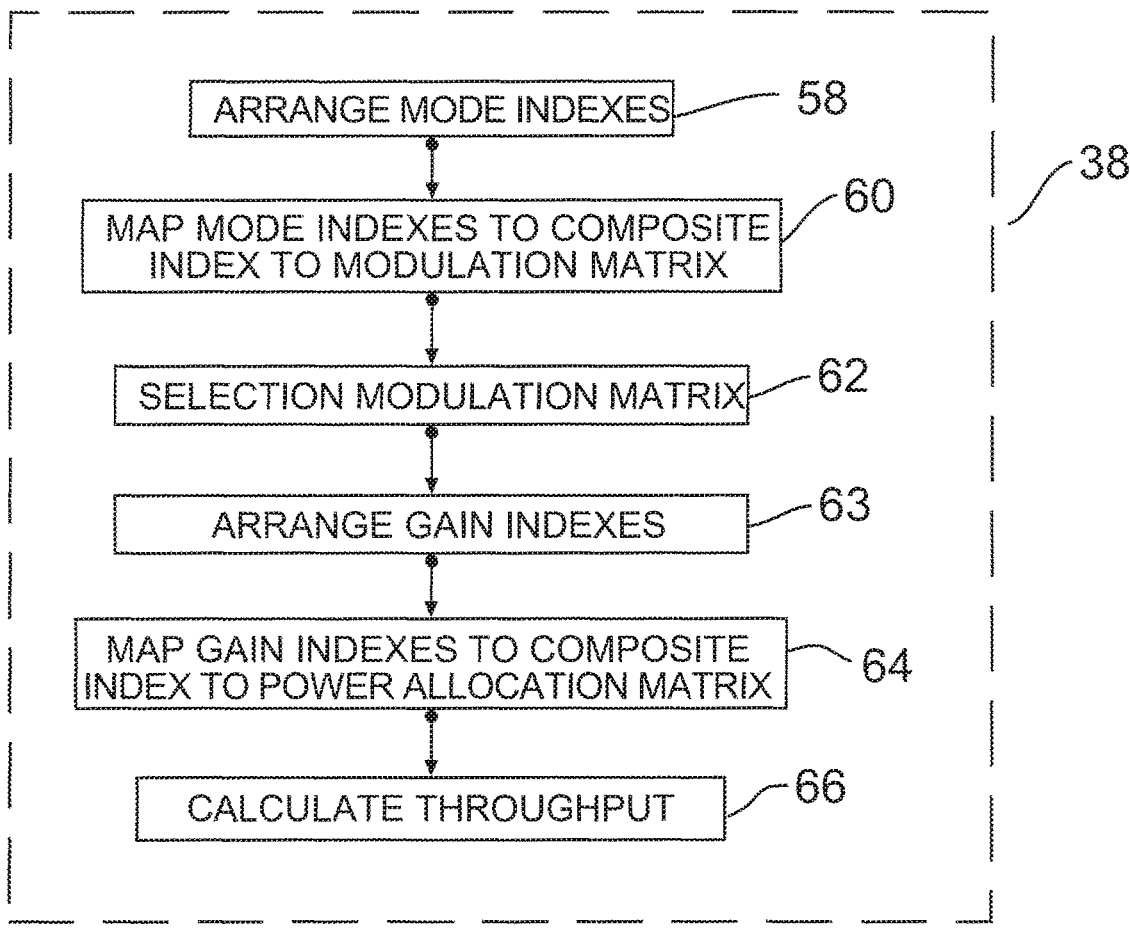
FIG. 6 is a flow diagram showing an embodiment of calculation of throughput at the transmitter in the system of FIG. 1 for multiple user case.
Figure 7:
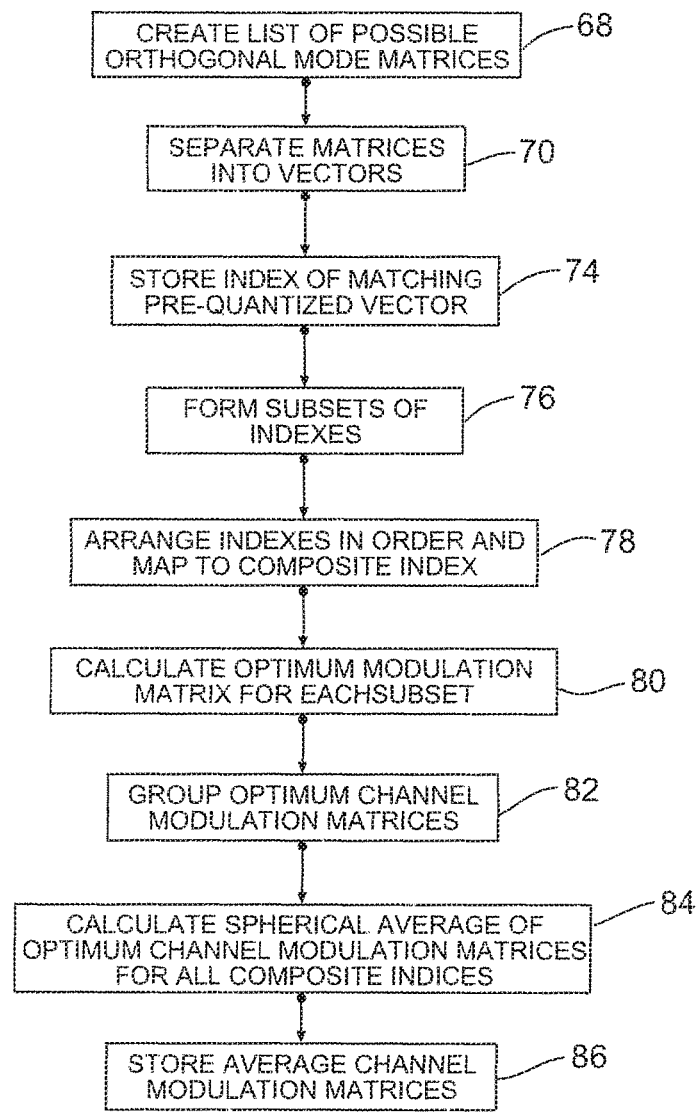
FIG. 7 is a flow diagram showing design of stored modulation matrices at the transmitter of FIG. 1 for multiple user case.
Figure 8:
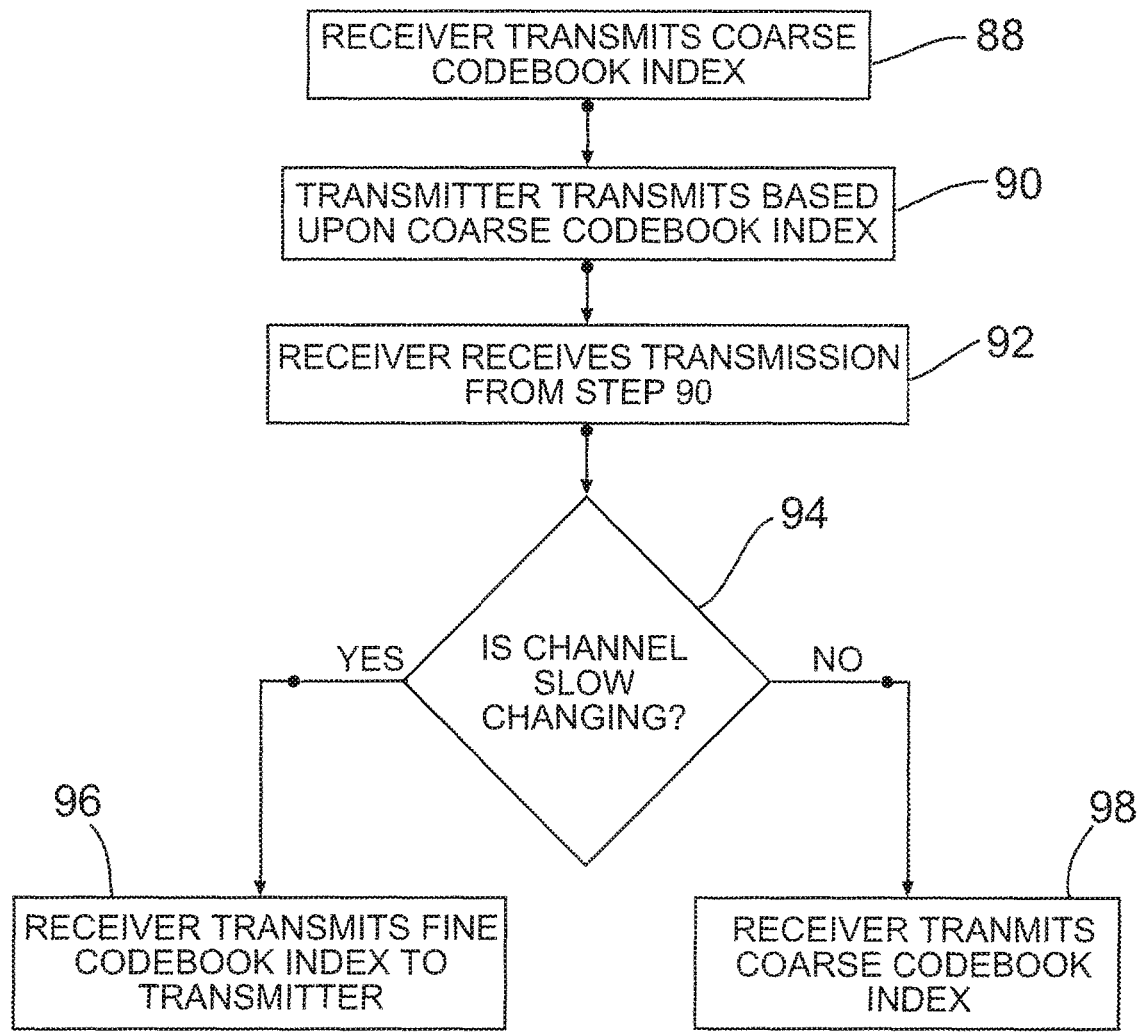
FIG. 8 is a flow diagram showing nested quantization.
Figure 9:
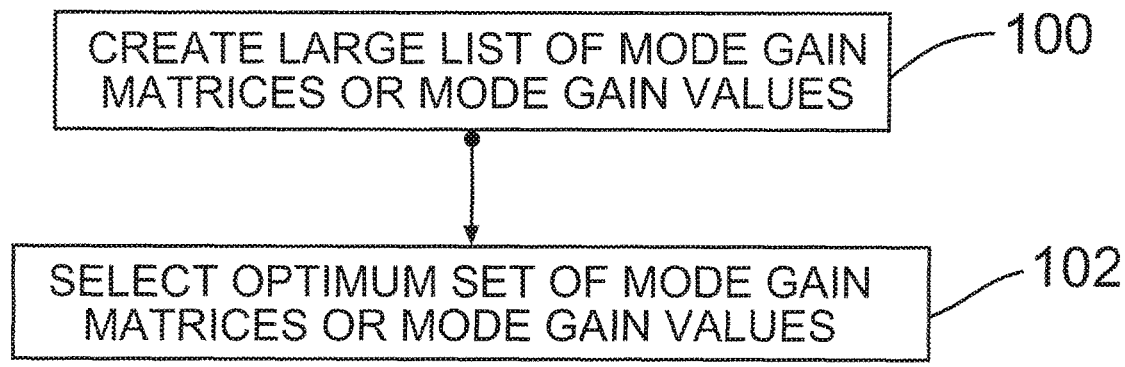
FIG. 9 is a flow diagram showing design of mode gain matrixes for use in the system of FIG. 1.
Figure 10:
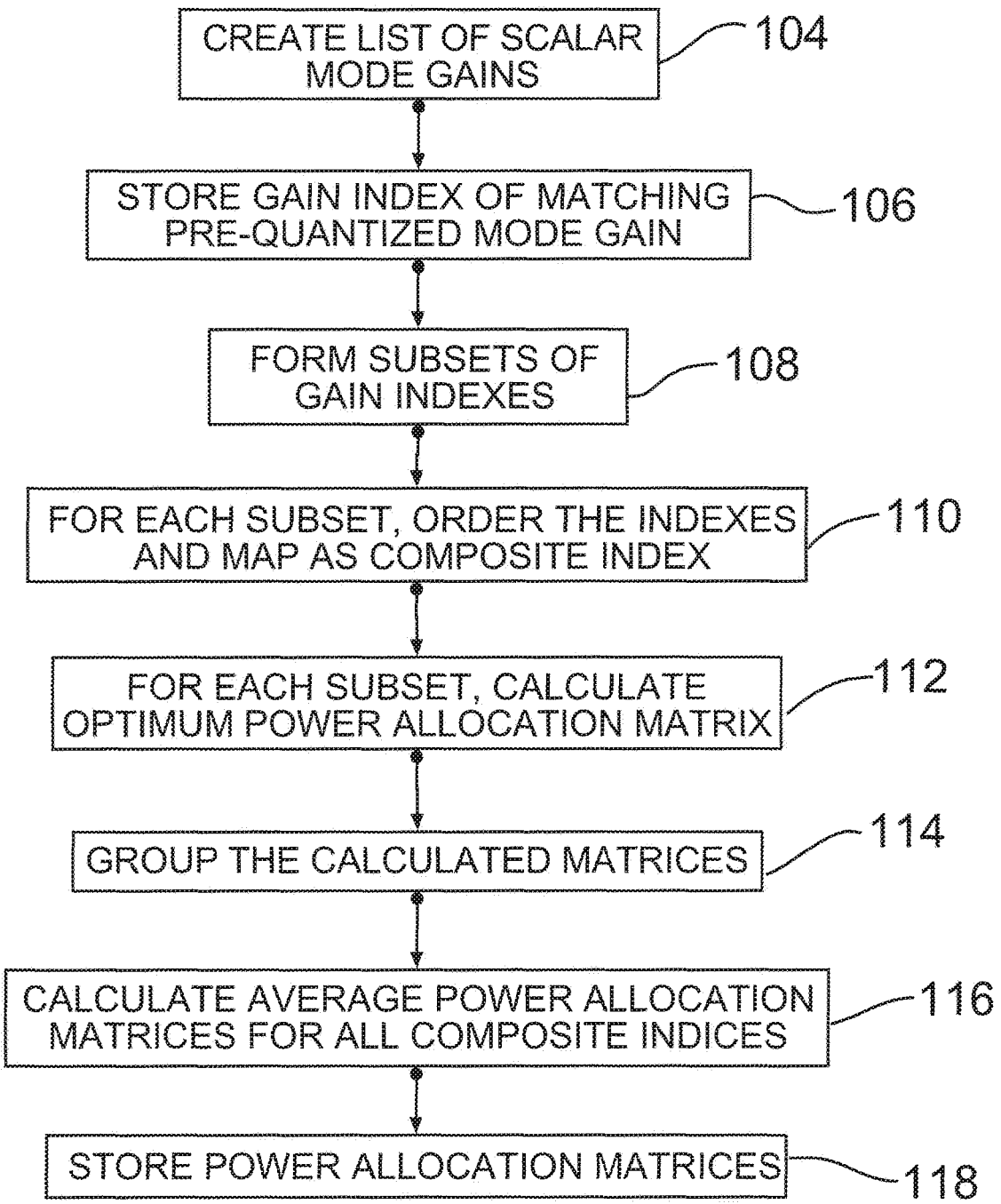
FIG. 10 is a flow diagram showing design of power allocation matrices for use at the transmitter of FIG. 1 for multiple user case.

One of the fundamental issues in multiple antenna systems is the availability of the channel state information (CSI) at transmitter and receiver[24]. The perfect CSI at the transmitter (CSIT) enables the use of a spatial water-filling, dirty paper coding and simultaneous transmission to multiple users, allowing the system to approach their maximum theoretical capacity. Such systems are usually referred to as closed-loop as opposed to open-loop systems where there is no feedback from the receiver. Closed-loop systems enable major increases of system capacities, allowing the operators to multiply their revenue and maintain high quality of service at the same time.

In this work, we describe a flexible approach to CSI encoding, which can be used to construct the linear modulation matrices for both single-user and multi-user networks. In both cases, the modulation matrices are composed of two independent parts: the eigenmode matrix and the diagonal power division matrix with the sum of entries on the diagonal equal to 1. The system operates as follows:

1. The receiver(s)[24] estimate(s) the respective multiple antenna channel(s).
2. Each estimated channel is decomposed using the singular value decomposition (SVD) to form the matrix of eigenmodes[3O] and their respective singular values [304].
3. If the system works in the single-user mode, all entries in the codebook of transmitter eigenmode modulation matrices[32] and all entries in the codebook of transmitter power division matrices[32A] are tested at the receiver to choose their combination providing highest instantaneous capacity. The indices of the best transmitter eigenmode and power division matrices are then sent[34],[34A] back to the transmitter.
4. If the system works in the multi-user mode, all entries in the codebook of receiver eigenmode vectors[32] and all entries in the codebook of receiver mode gains[32A] are tested at the receiver[24] for best match with the estimated channel (the matching function can be chosen freely by the system designer). The indices of the best receiver eigenmode and power division matrices [94] are then sent [34] back to the transmitter.
5. Based on the received[36],[36A] indices, the transmitter chooses[38],[52],[62] the modulation matrix and uses it to transmit[40] the information to one or more users[24] at a time.

Our proposed method allows to simplify the feedback system by implementing only one set of eigenmode matrices for all values of signal-to-noise ratio (SNR) and a much smaller set of power division matrices that differ slightly for different values of SNR. As a result, the required feedback bit rate is kept low and constant throughout the whole range of SNR values of interest. The additional advantage of the splitting of the modulation matrix into two parts is that it can lower the feedback bit rate for slowly-varying channels. If the eigenmodes of the channel stay within the same region for an extended period of time, additionally, nested encoding can be performed to increase the resolution of the CSIT and improve the system capacity.

The actual design of the receiver and transmitter eigenmode and power division matrices can be done using numerical or analytical methods and is not the object of this disclosure. However, our method allows for actual implementations of systems closely approaching the theoretical capacities of MIMO channels without putting any unrealistic demand on the feedback link throughput. This is a major improvement compared to the other state-of-the art CSI quantization methods, which experience problems approaching the theoretical capacities and suffer from the early onset of capacity ceiling due to inter-user interference at relatively low SNR.

I. System Model for Single User Communication and OFDM

We assume that the communication system consists of a transmitter equipped with $n_T$ attennas[22] and a receiver[24] with $N_R$ antennas[26]. A general frequency selective fading channel is modeled by a set of channel matrices $H_j$ of dimension $n_R \times n_T$ defined for each sub-carrier j=0, 1, . . . $N_{OFDM}$-1. The received signal at the jth sub-carrier is then given by the $n_R$-dimensional vector $y_j$ defined as $$y_j = H_j x_j + n_j \quad (1)$$

where $x_j$ is the $n_T$-dimensional vector of the transmitted signal and $n_j$ is the $n_R$-dimensional vector consisting of independent circular complex Gaussian entries with zero mean and variance 1. Moreover, we assume that power is allocated equally across all sub-carriers $|x_j|^2$=P.

II. Quantizing Water-Filling Information

If the transmitter has access to the perfect channel state information about the matrix $H_j$, it can select the signaling vector $x_j$ to maximize the closed-loop system capacity $$C = \sum_j \log_2 \det[I + H_j Q_j H_j^H] \quad (2)$$

where $Q_j = E[x_j x_j^H]$. Unfortunately, optimizing the capacity in (2) requires a very large feedback rate to transmit information about optimum $Q_j$ (or correspondingly $H_j$) which is impractical. Instead, we propose using a limited feedback link, with the transmitter choosing from a set of matrices $\hat{Q}(n)$.

Using the typical approach involving singular value decomposition and optimum water-filling, we can rewrite (1) as $$y_j = H_j x_j + n_j = (U_j D_j V_j^H)(V_j \tilde{x}_j) + n_j \quad (3)$$

where $E[\tilde{x}_j \tilde{x}_j^H] = S_j$ constrained with $\text{Tr}(S_j) = P$ is a diagonal matrix describing optimum power allocation between the eigenmodes in $V_j$. Based on (3), the set of matrices $Q_j = V_j S_j V_j^H$, maximizes capacity in (2).

To construct the most efficient vector quantizer for channel feedback, the straightforward approach would be to jointly optimize signal covariance matrices $\hat{Q}$ for all sub-carriers at once. Such an approach, however, is both complex and impractical, since any change of channel description and/or power level would render the optimized quantizer suboptimal. Instead, we propose an algorithm which separately quantizes information about eigenmode matrices $V_j$ in codebook $\hat{V}$ and power allocation $S_j$ in codebook $\hat{S}$. Note that the first variable depends only on channel description and not on the power level P which simplifies the design.

We optimize the quantizers $\hat{V}$ and $\hat{S}$ for flat-fading case and we apply them separately for each sub-carrier in case of OFDM modulation. Although such an approach is sub-optimal, it allows a large degree of flexibility since different system setups can be supported with the same basic structure.

A. Quantizing Eigenmodes

We assume that the receiver[24] has perfect channel state information (CSIR) and attempts to separate[30] the eigen-mode streams $\tilde{x}_j$ in (3) by multiplying $y_j$ with $U_j^H$. However, if the transmitter uses quantized eigenmode matrix set with limited cardinality, the diagonalization of $\tilde{x}_j$ will not be perfect. To model this, we introduce a heuristic distortion metric which is expressed as $$\gamma v(n;H) = \|DV^H \hat{V}(n) - D\|_F \quad (4)$$

where $\hat{V}(n)$ is the nth entry in the predefined set of channel diagonalization matrices and $\|\cdot\|_F$ is the Frobenius norm. We omitted subscript entries j in (4) for the clarity of presentation.

We assume that $n = 0, 1, \ldots 2^{N_v}-1$ where $N_v$ is the number of bits per channel realization in the feedback link needed to represent the vectors $\hat{V}(n)$. To design the quantizer using (4), we divide the whole space of channel realizations H into $2^{N_v}$ regions $V_i$ where $$V_i = \{H : \gamma v(i;H) < \gamma v(j;H) \text{ for all } j \neq i\}. \quad (5)$$

It can be shown that minimizing this metric should, on average, lead to maximizing the ergodic capacity of the channel with the quantized feedback (when $\gamma(n;H)=0$ the channel becomes perfectly diagonalized). The optimum selection of $\hat{V}$ and regions $V_i$ in (5) is an object of our current work. Here, however, we use a simple iterative heuristic based on a modified form of the Lloyd algorithm, which has very good convergence properties and usually yields good results. The algorithm starts by creating a codebook of centroids $\hat{V}$ and, based on these results, divides the quantization space into regions $V_i$. The codebook is created as follows:[50]

1. Create a large training set of L random matrices H(l).[46]
2. For each random matrix H(l), perform singular value decomposition to obtain D(l) and V(l) as in (3).
3. Set iteration counter i=0. Create a set of $2^{N_v}$ random matrices $\hat{H}(n)$.
4. For each matrix $\hat{H}(n)$ calculate corresponding $\hat{V}^{(i)}(n)$ using singular value decomposition.
5. For each training element H(l) and codebook entry $\hat{V}^{(i)}(n)$ calculate the metric in (4). For every l choose indexes $n_{opt}(l)$ corresponding to the lowest values of $\gamma v(n;H(l))$.
6. Calculate a new set $\hat{V}^{(i+1)}(n)$ as a form of spherical average of all entries V(l) corresponding to the same index n using the following method. (The direct averaging is impossible since it does not preserve orthogonality between eigenvectors.) For all n calculate the subsets $L(n) = \{l : n_{opt}(l) = n\}$ and if their respective cardinalities $|L(n)| \neq 0$ the corresponding matrices $\overline{Q}^{(i+1)}(n)$ can be obtained as $$\overline{Q}^{(i+1)}(n) = \frac{1}{|L(n)|} \sum_{l \in L(n)} V(l)^1 O V(l)^H \quad (6)$$

where $^1O$ is an $n_T \times n_T$ all-zero matrix with the exception of the upper-left corner element equal to 1. Finally, using singular value decomposition, calculate $\hat{V}^{(i+1)}(n)$ from $$\overline{Q}^{(i+1)}(n) = \hat{V}^{(i+1)}(n) W (\hat{V}^{(i+1)}(n))^H \quad (7)$$

where W is a dummy variable.

7. Calculate the average distortion metric $$\overline{\gamma}_v^{(i+1)} = 1/L \Sigma_l \gamma v(n_{opt}(l); H(l)).$$

8. If distortion metric fulfills $|\overline{\gamma}_v^{(i+1)} - \overline{\gamma}_v^{(i)}|/\overline{\gamma}_v^{(i)} < \Theta$, stop. Otherwise increase i by 1 and go to 5).

Figure 11A:
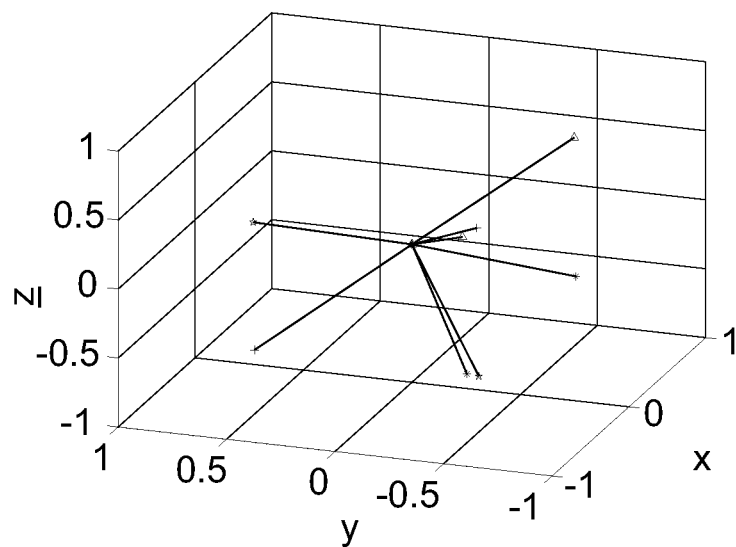
FIGS. 11A and 11B show the distribution of $\hat{V}$ and $\hat{S}$ respectively in vector codebooks for a 2×2 MIMO system and $N_f=2$ and $N_S=1$. The two orthogonal eigenvectors in each $\hat{V}$ matrix are shown using the same line style. The X-axis corresponds to the real entries in the first rows of $\hat{V}$ and the YZ-plane corresponds to the complex entries in the second rows of the matrices. In case of $\hat{S}$, the entries are presented for different power levels P in a normalized form Ŝ/P.

Upon completion of the above algorithm, the set of vectors $\hat{V}$ can be used to calculate the regions in (5). The results of the codebook optimization are presented in FIG. 11A for a case of $n_T = n_R = 2$ and $N_V = 2$. The optimization was performed using $L = 1,000 \cdot 2^{N_v}$ and $\Theta = 10^{-7}$.

B. Quantizing Power Allocation Vectors

Having optimized[50] power-independent entries in the codebook of channel eigenmode matrices $\hat{V}$, the next step is to create a codebook for power allocation $\hat{S}[118]$. We use a distortion metric defined as $$\gamma s(k; H; P) = \frac{\det[I + HQH^H]}{\det[I + H\hat{V}(n_{opt})\hat{S}(k)\hat{V}^H(n_{opt})H^H]} \quad (8)$$

where $\hat{S}(k)$ is the kth entry in the predefined set of channel water-filling matrices and $\hat{V}(n_{opt})$ is the entry in the $\hat{V}$ codebook that minimizes metric (4) for the given H. We use $k = 0, 1, \ldots 2^{N_s}-1$ where $N_S$ is the number of bits per channel realization in the feedback link needed to represent the vectors $\hat{S}(k)$. Minimizing the metric in (8) is equivalent to minimizing the capacity loss between the optimum water-filling using Q and the quantized water-filling using $\hat{V}$ and $\hat{S}$.

Similarly to the previous problem, we divide the whole space of channel realizations H into $2^{N_s}$ regions $S_i(P)$ where $$S_i(P) = \{H : \gamma s(i;H;P) < \gamma s(j;H;P) \text{ for all } j \neq i\}. \quad (9)$$

and to create the codebook $\hat{S}$, we use the following method:
1. Create a large training set of L random matrices H(l).
2. For each random matrix H(l), perform water-filling operation to obtain optimum covariance matrices Q(l) and S(l).
3. Set iteration counter i=0. Create[100],[104] a set of $2^{N_s}$ random diagonal matrices $\hat{S}^{(i)}(k)$ with $Tr(\hat{S}^{(i)}(k))=P$.
4. For every codebook entry $\hat{S}^{(i)}(k)$ and matrix Q(l) calculate[112] the metric as in (8). Choose[106] indexes $k_{opt}(l)$ corresponding to the lowest values of $\gamma_S(k;H(l);P)$.
5. If $\gamma_S(k_{opt}(l);H(l);P) > \gamma_{eq}(H(l);P)$ where $\gamma_{eq}(H(l);P)$ is the metric corresponding to equal-power distribution defined as $$\gamma eq(H(l);P) = \frac{\det[I + H(l)Q(l)H^H(l)]}{\det[I + P/n_T H(l)H^H(l)]}, \quad (10)$$

set the corresponding entry $k_{opt}(l)=2^{N_s}$. For all k calculate the subsets[108] $L(k)=\{l:k_{opt}(l)=k\}$.
6. For all $k=0, 1, \ldots 2^{N_s}-1$[114] for which $|L(k)| \neq 0$, calculate[116] a new $\hat{S}^{(i+1)}(k)$ as the arithmetic average $$\hat{S}^{(i+1)}(k) = \frac{1}{|L(k)|} \sum_{l \in L(n)} S(l) \quad (11)$$

7. Calculate the average distortion metric $$\bar{\gamma}_s^{(i+1)} = \frac{1}{L} \sum_l \min\{\gamma_S(k_{opt}(l); H(l)P), \gamma_{eq}(H(l)P)\} \quad (12)$$

8. If distortion metric fulfills $|\bar{\gamma}_s^{(i+1)} - \bar{\gamma}_s^{(i)}|/\bar{\gamma}_s^{(i)} < \Theta$ stop. Otherwise increase i with 1 and go to 4).

Figure 11B:
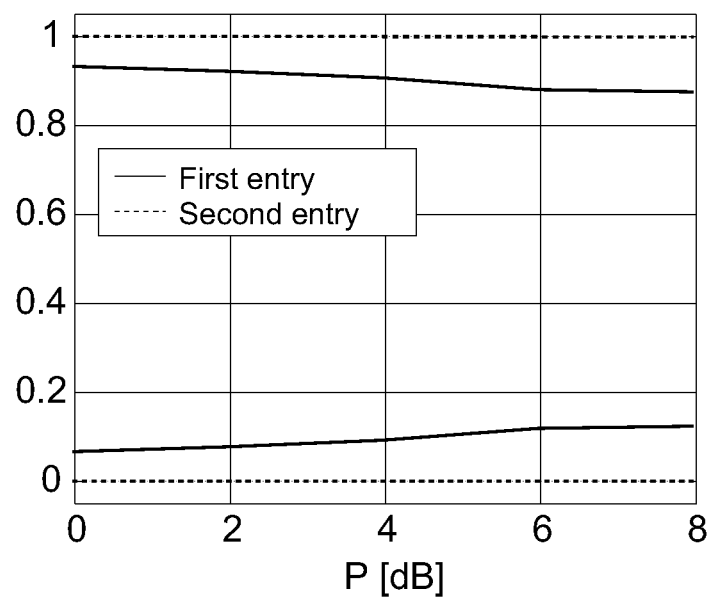

The set of vectors $\hat{S}$ is then used to calculate the regions in (9). Since waterfilling strongly depends on the power level P and $\hat{V}$, optimally the $\hat{S}$ should be created for every power level and number of bits $N_V$ in eigenvector matrix codebook. As an example, the results of the above optimization are presented in FIG. 11B for a case of $n_T=n_R=2$, $N_V=2$ and $N_S=1$. The optimization was performed using $L=1,000 \cdot 2^{N_s}$ and $\Theta = 10^{-7}$. The curves show the entries on the diagonals of the two matrices $\hat{S}(k)$ normalized with P. As one can see, one of the matrices tends to assign all the power to one of the eigenmodes, while the other balances the assignment between them. As expected, the balancing becomes more even with increasing P where the capacity of the equal-power open-loop systems approaches the capacity of the water-filling closed-loop systems. Since the differences between the entries of $\hat{S}(k)$ are not that large for varying powers, it is possible to create an average codebook $\hat{S}$ which could be used for all values of P but we do not treat this problem in here.

An interesting property of the above algorithm is that it automatically adjusts the number of entries in $\hat{S}$ according to the number of entries in $\hat{V}$. For low values of $N_V$, even if the algorithm for selection of $\hat{S}$ is started with high $N_S$, the optimization process will reduce the search space by reducing cardinality $|L(k)|$ of certain entries to 0. As a result, for $N_V=2, 3, N_S=1$ will suffice, while for $N_V=4$, the algorithm will usually converge to $N_S=2$. This behavior can be easily explained since for low resolution of the channel eigenvector matrices $\hat{V}$ only low precision is necessary for describing $\hat{S}$. Only with increasing the precision $N_V$, the precision $N_S$ becomes useful.

III. VQ Algorithm for Flat-Fading MIMO Channels

The vector quantizers from the previous sections are first applied to a flat-fading channel case. In such a case, the elements of each matrix H in (1) are independent circular complex Gaussian elements, normalized to unit variance.

The system operation can now be described as follows:
1. The receiver[24] estimates the channel matrix H.
2. The receiver[24] localizes the region $V_i$ according to (5) and stores its index as $n_{opt}$.[32]
3. Using $n_{opt}$, the receiver[24] places H in a region $S_i$ according to (9) and stores its index as $k_{opt}$.
4. If the resulting system capacity using the predefined codebook entries is higher than the capacity of equal power distribution as in $$C(n_{opt}, k_{opt}) > \log_2 \det[I+P/n_T HH^H] \quad (13)$$

indexes $n_{opt}$ and $k_{opt}$ are fed back to the transmitter. [34],[36]
5. The transmitter uses[40],[38A] the received indices of a codebook entries to process its signal. If there is no feedback, power is distributed equally between the antennas[22].

Using the above algorithm, the system's performance is lower-bounded by the performance of the corresponding open-loop system and improves if the receiver [24] finds a good match between the channel realization and the existing codebook entries. The salient advantage of such an approach is its flexibility and robustness to the changes of channel model. If there are no good matches in the codebook, the feedback link is not wasted and the transmitter uses the equal power distribution. The disadvantage of the system is that the feedback link is characterized by a variable bit rate.

IV. VQ Algorithm for Frequency-Selective MIMO-OFDM Channels

In case of the frequency-selective channel, flat fading algorithm is applied to the separate OFDM sub-carriers. Although this approach is clearly sub-optimal, it allows us to use a generic vector quantizer trained to the typical flat-fading channel in a variety of other channels.

In general case, the feedback rate for such an approach would be upperbounded by $N_{OFDM}(N_V+N_D)$. However, as pointed out by Kim et al., the correlation between the adjacent sub-carriers in OFDM systems can be exploited to reduce the required feedback bit rate by proper interpolating between the corresponding optimum signalling vectors. In this work, we use a simpler method which allows the receiver[24] to simply group adjacent M sub-carriers and perform joint optimization using the same codebook entry for all of them (such methods are sometimes called clustering).

V. Simulation Results

A. Flat-Fading Channel

We tested the system on 2×2 MIMO and 4×4 MIMO channels with varying SNR and feedback rates. We tested 2×2 MIMO channel with $N_V=2, 3, 4$ and $N_D=1$, corresponding to total feedback rate of between 3 and 5 bits. Correspondingly, in case of 4×4 MIMO, we used $N_V=10, 12, 14$ and $N_D=2$, corresponding to total feedback rate between 12 and 16 bits. We define an additional parameter called feedback frequency, v which defines how often the receiver[24] requests a specific codebook entry instead of equal power distribution and an average feedback bit rate as $R_b=v(N_V=N_S)$.

Figure 12A:
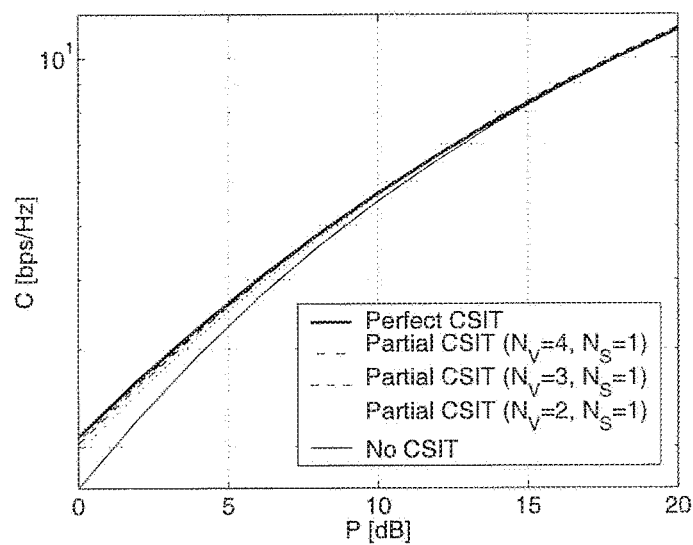
FIG. 12A shows ergodic system capacity C and FIG. 12B shows average feedback bit rate $R_b$ for different granularities of channel state information at the transmitter on the flat fading channel. System capacity is shown in logarithmic scale to better illustrate the differences between curves.
Figure 12B:
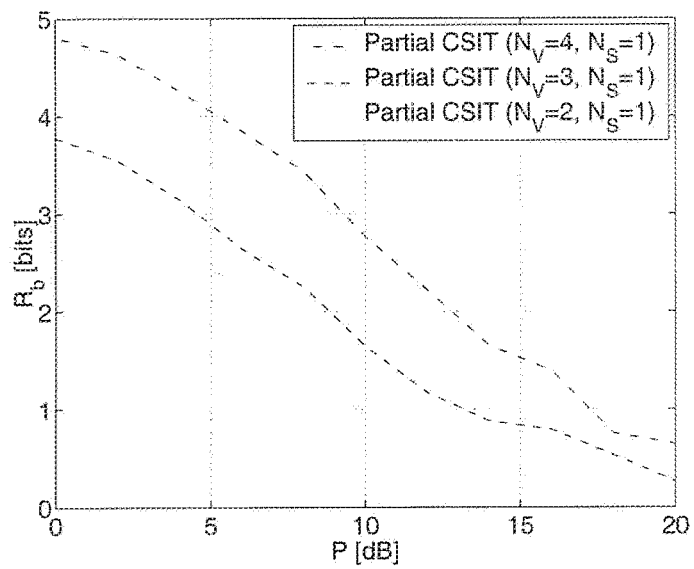

FIG. 12(a) presents the results of simulations of ergodic capacity of the system (based on 100,000 independent channel matrices H) in case of perfect CSIT, vector quantized feedback (partial CSIT) and no CSIT. It is clearly seen that, even for very low bit rates on a feedback channel, the proposed scheme performs closely to the optimum. A rule of thumb seems to be that the number of bits needed to encode the codebook is approximately equal to $n_T \times n_R$. Moreover, FIG. 12(b) shows that as the SNR grows, less feedback is required to provide good system performance and the proposed algorithm automatically reduces the reverse link usage.

It is also interesting to note that increasing the quality of quantization increases the feedback frequency v. This is a consequence of the fact that there is a higher probability of finding a good transmit signal covariance matrix when there are a lot of entries in the codebook.

B. Frequency-Selective Channel

We have simulated the 2×2 MIMO system using the OFDM modulation with carrier frequency: $f_c$=2 GHz; signal bandwidth; B=5 MHz, number of sub-carriers; $N_{OFDM}$=256; ITU-R M.1225 vehicular A channel model with independent channels for all pairs of transmit and receive antennas[22] [26]; the guard interval equal to the maximum channel delay.

Figure 13A:
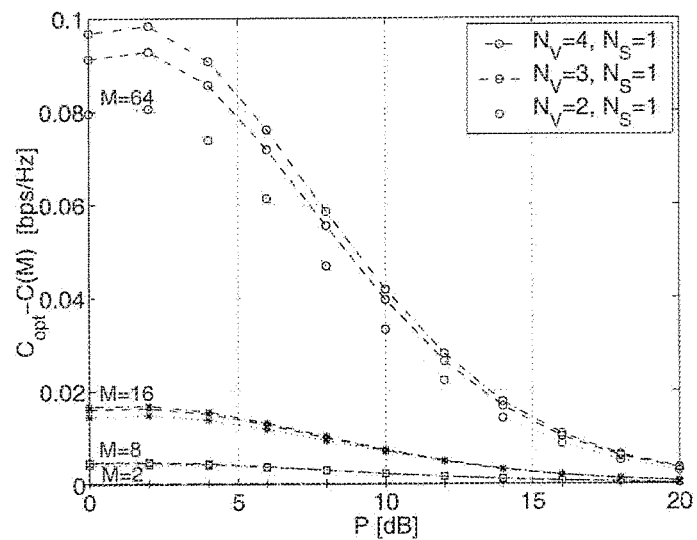
FIG. 13A shows capacity loss and FIG. 13B shows average feedback bit rate $R_b$ on the frequency selective channel.
Figure 13B:
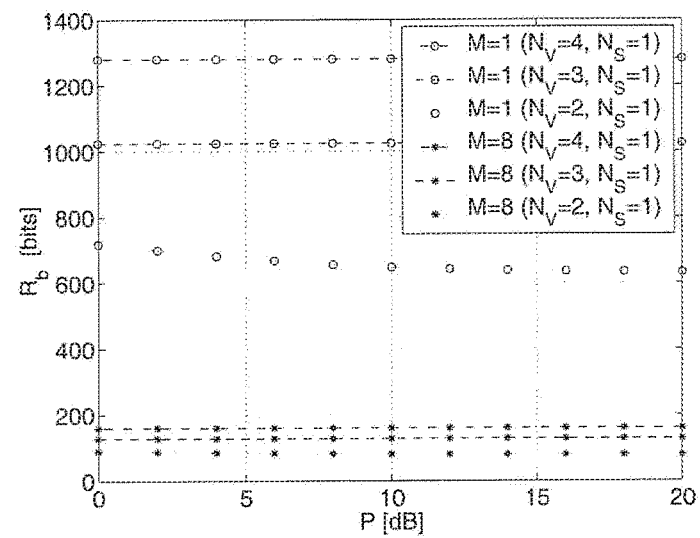

The results of simulations are presented in FIGS. 13A and 13B. Since the capacity curves of this system are very similar to capacity of the flat-lading 2×2 system in FIGS. 12A and 12B we decided to show the losses of performance as compared to the perfect water-filling case instead. FIG. 13A shows the loss of performance defined as C-C(M) where C is defined in (2) and $C(N_V, N_S, M)$ is the capacity of the system with different feedback rates and clustering of M sub-carriers. As expected, increasing the clustering, decreases the throughput since the same covariance matrix is used for too many adjacent sub-carriers. At the same time, in FIG. 13B shows that the required average feedback rate decreases significantly with increasing M. For the simulated channel, the best results are provided by M=8, which is approximately equal to the coherence bandwidth of the channel. An interesting feature of the OFDM-MIMO is that, unlike in the flat-fading case, the feedback rate remains almost constant throughput the P range. In any case, however, around two orders of magnitude more feedback bit rate is required on frequency selective channel.

VI. System Model for Multi User Communication

We assume that the communication system consists of a transmitter equipped with $n_T$ antennas[22] and $K \geq n_T$ mobile receivers[24] with identical statistical properties and $n_R(k)$ antennas[26], where k=1, 2, ... K. The mobile user channels are modeled by a set of i.i.d. complex Gaussian channel matrices $H_k$ of dimension $n_R(k) \times n_T$. (Throughout the document we use the upper-case bold letters to denote matrices and lower-case bold letters to denote vectors.) The received signal of the kth user is then given by the $n_R(k)$-dimensional vector $y_k$ defined as $$y_k = H_k x + n_k \quad (14)$$

where x is the $n_T$-dimensional vector of the transmitted signal and $n_k$ is the $n_R(k)$-dimensional vector consisting of independent circular complex Gaussian entries with zero means and unit variances. Finally, we assume that the total transmit power at each transmission instant is equal to P. The above assumptions cover a wide class of wireless systems and can easily be further expanded to include orthogonal frequency division multiplexing (OFDM) on frequency-selective channels or users with different received powers (due to varying path loss and shadowing).

Although theoretically it is possible to design the optimum CSI quantizer for the above canonical version of the system, such an approach may be impractical. For example, subsets of receivers[24] with different numbers of receive antennas[26] would require different CSI codebooks and quantizer design for such a system would be very complex. To alleviate this problem, we assume that the base station treats each user as if it was equipped with only one antenna [26], regardless of the actual number of antennas[26] it may have. While suboptimal, such an approach allows any type of a receiver[24] to work with any base station and may be even used to reduce the quantization noise as shown by Jindal. We call such system setup virtual multiple-input single-output (MISO) since, even though physically each transmitter-receiver link may be a MIMO link, from the base station's perspective it behaves like MISO.

We follow the approach of Spencer et al., where each user performs singular value decomposition of $H_k = U_k S_k V_k^H$ [30] and converts its respective $H_k$ to a $n_T$-dimensional vector $h_k$ as $$h_k = u_k^H H_k = s_k^{max} v_k^h \quad (15)$$

[42] where $s_k^{max}$ is the largest singular value[30A] of $S_k$ and $u_k$ and $v_k$ are its corresponding vectors[30] from the unitary matrices $U_k$ and $V_k$, respectively.

Based on (15), the only information that is fed[36],[36A] back from [34],[34A] the receivers[24] to the transmitter is the information about the vectors $h_k$, which vastly simplifies the system design and allows for easy extensions. For example, if multiple streams per receiver are allowed, the channel information for each stream can be quantized using exactly the same algorithm.

VII. System Design with Full CSIT

In this section, we present typical approaches for the system design when full CSIT is available. As a simple form of multi-user selection diversity, we define a subset of active users with cardinality $n_T$ as S. Furthermore, for each subset S, we define a matrix $H[S] = [h_1^T, h_2^T, \ldots, h_{n_T}^T]^T$, whose rows are equal to the channel vectors $h_k$ of the active users.

A. Cooperative Receivers

The upper-bound for system sum-rate is obtained when the users are assumed to be able to cooperate. With such an assumption, it is possible to perform singular value decomposition of the joint channel as $H[S] = U[S]S[S]V^H[S]$. Defining $s_i$ as the entries on the diagonal of S[S] allows to calculate the maximum sun-rate of a cooperative system as $$R^{coop} = \max_S \sum_{i=1}^{n_T} [\log_2(\xi[S]s_i^2)]_+ \quad (16)$$

where $\xi[S]$ is the solution of the water-filling equation $\sum_{i=1}^{n_T} [\xi[S] - 1/s_i^2]_+ = P$.

B. Zero-Forcing Dirty-Paper Coding

In practice, the receivers[24] cannot cooperate and the full diagonalization of the matrix H[S] is impossible. The problem can still be solved by using linear zero-forcing (ZF) followed by non-linear dirty paper precoding, which effectively diagonalizes the channels to the active users. The matrix H[S] is first QR-decomposed as $H[S] = L[S]Q[S]$, where L[S] is lower triangular matrix and Q[S] is a unitary matrix. After multiplying the input vector x by $Q[S]^H$, the resulting channel is equal to L[S], i.e., the first user does not suffer from any multi-user interference (MUI), the second user receives interference only from the first user, etc.

In this case, non-causal knowledge of the previously encoded signals can be used in DPC encoder allowing the signal for each receiver[24] i>1 to be constructed in such a way that the previously encoded signals for users k<i, are effectively canceled at the ith receiver[24]. Since the effective channel matrix is lower triangular, the channel will be diagonalized after the DPC, with $l_i$ being the entries on the diagonal of L[S]. This leads to maximum sum-rate calculation as $$R^{zf-dpc} = \max_{S^{ord}} \sum_{i=1}^{n_T} [\log_2(\xi[S^{ord}]l_i^2)]_+ \quad (17)$$

where $\xi[S^{ord}]$ is the solution of the water-filling equation. Note that, as opposed to (16), the maximization is performed over ordered versions of the active sets S.

C. Linear Modulation

Even though, theoretically, the above approach solves the problem of the receiver[24] non-cooperation, its inherent problem is the absence of effective, low complexity DPC algorithms. Moreover, since dirty-paper coding requires full CSIT it is likely that systems employing DPC would require significantly higher quality of channel feedback than simpler, linear preceding systems.

We use the linear block diagonalization approach, which eliminates MUI by composing the modulation matrix B[S] of properly chosen null-space eigenmodes for each set S. For each receiver[24] i∈S, the ith row of the matrix H[S] is first deleted to form H[$S_i$]. In the next step, the singular value decomposition is performed[30],[30A] to yield H[$S_i$]=U[$S_i$]S[$S_i$]$V^H$[$S_i$]. By setting the ith column of B[S] to be equal to the rightmost vector of V[$S_i$], we force the signal to the ith receiver[24] to be transmitted in the null-space of the other users and no MUI will appear. In other words, the channel will be diagonalized with $d_i$ being the entries on the diagonal of H[S]B[S]. This leads to formula $$R^{linear} = \max_{S} \sum_{i=1}^{n_T} [\log_2(\xi[S]d_i^2)]_+ \quad (18)$$

where $\xi[S]$ is the solution of the water-filling equation.

Figure 14:
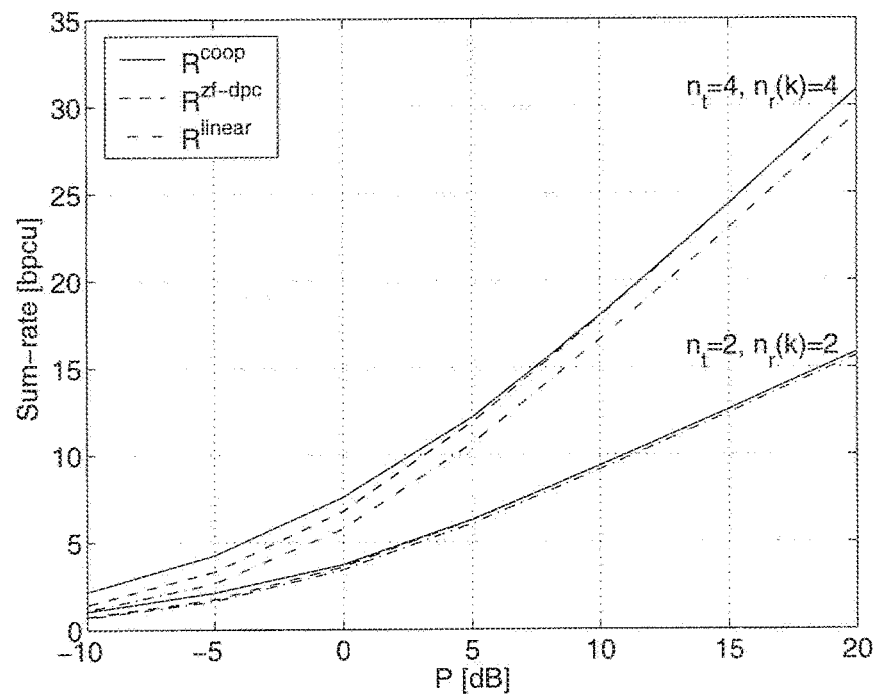
FIG. 14 shows sum-rates of cooperative, zero-forcing DPC and linear systems with full CSIT and 10 users with identical receivers.

As an example, FIG. 14 shows the sum-rates of the discussed systems for K=10 users and different antenna configurations. The zero-forcing DPC system approaches the cooperative system's sum-rate as the transmitted power increases. The sub-optimal linear modulation provides lower sum-rate but losses at P>0 dB, as compared to the ZF-DPC system, are in the range of only 1-2 dB for the 4×4 configuration and fractions of dB for the 2×2 system. Since the linear system is much easier to implement than ZF-DPC, we will use it to test our CSI encoding algorithms.

VIII. System Design with Partial CSIT

The systems discussed so far are usually analyzed with assumption that, at any given time, the transmitter will have full information about the matrices H[S]. Unfortunately, such an assumption is rather unrealistic and imperfect CSIT may render solutions relying on full CSIT useless.

Figure 15:
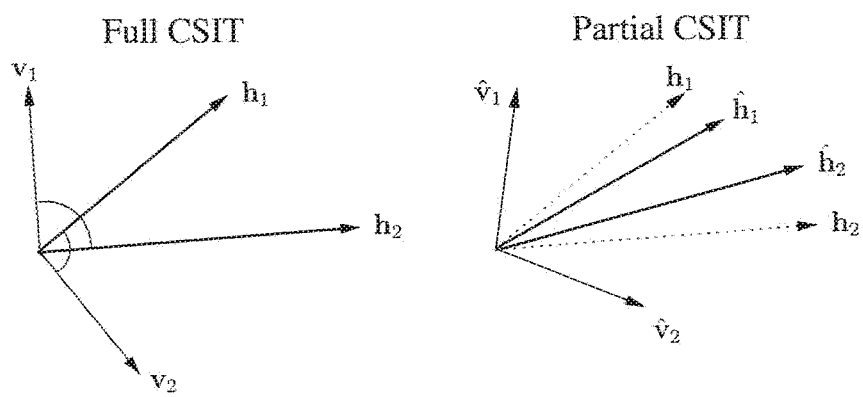
FIG. 15 is an example of multi-user interference caused by partial CSIT.

In practice, the receivers[24] will quantize the information about their effective channel, vectors $h_k$[30] as $\hat{h}_k$[32], according to some optimization criterion. Based on this information, the transmitter will select[38],[52],[62] the best available modulation matrix $\hat{B}$ from the predefined transmitter codebook and perform water-filling using the best predefined power division matrix $\hat{D}$. Regardless of the optimization criterion, the finite cardinality of the vector codebooks will increase MUI and lower system throughput. FIG. 15 shows the mechanism leading to appearance of the MUI in a simple system with $n_T$=2 and K=2 users with effective channel vectors $h_1$ and $h_2$, encoded by the quantizer as $\hat{h}_1$ and $\hat{h}_2$. If the full CSIT is available, the transmitter will choose[38] a modulation matrix based on eigenmodes $v_1$ and $v_2$, which are perpendicular to vectors $h_2$ and $h_1$, respectively. As a result, each user will be able to extract its desired signal without MUI. With partial CSIT, however, the transmitter will obtain only approximate versions of the effective channel vectors, and the resulting modulation matrix will be based on eigenmodes $\hat{v}_1$ and $\hat{v}_2$, whose dot products with $h_2$ and $h_1$ will not be zero, causing the MUI.

IX. CSI Quantization Algorithms

The fundamental difference between CSI encoding in single-user and multiple-user systems is that during normal system operation, each receiver[24] chooses its vector $\hat{h}_k$ without any cooperation with other receivers[24]. This means that the design of optimum codebook for $h_k$ must precede the design of codebooks $\hat{B}$ and $\hat{D}$. Based on (15), one can see that channel state information in form of the vector $h_k$ consists of the scalar value of channel gain[30A] $s_k^{max}$ and the eigenmode[30] $v_k^H$. Since these values are independent, we propose an algorithm which separately quantizes the information about eigenmodes[32] in codebook $\hat{v}$ and amplitude gains[32A] in codebook $\hat{s}$.

A. Quantization[32],[51] of Receiver Channel Eigenmodes

We assume that $N_v$ is the number of bits per channel realization in the feedback link needed to represent the vectors $v_k$ in (15). We divide the space of all possible v's into $2^{N_v}$ regions $v_i$ $$v_i = \{v : \gamma_v(i;v) < \gamma_v(j;v) \text{ for all } j \neq i\} \quad (19)$$

where $\gamma_v$(n; v) is a distortion function. Within each region $v_i$, we define a centroid vector $\hat{v}(i)$[49], which will be used as a representation of the region. The design of the codebook $\hat{v}$ can be done analytically and/or heuristically using for example the Lloyd algorithm. In this work, we define the distortion function as the angle between the actual vector v and $\hat{v}(i)$: $\gamma_v(i;v) = \cos^{-1}(\hat{v}(i) \cdot v)$, which has been shown by Rob and Rhao to maximize ergodic capacity, and use Lloyd algorithm to train[47] the vector quantizer. Note that the construction of $\hat{v}$ is independent of the transmit power.

B. Quantization[32A] of Receiver Amplitude Gains

We assume that $N_s$ is the number of bits per channel realization in the feedback link needed to represent the scalar $s_k^{max}$ in (15). We divide the space of all possible channel realizations s=$s_k^{max}$ into $2^{N_s}$ regions $s_i$ $$s_i = \{s : |\hat{s}(i) - s| < |\hat{s}(j) - s| \text{ for all } j \neq i\} \quad (20)$$

where $\hat{s}(i)$[100] are scalar centroids representing regions $s_i$. In this work, we perform the design[102] of the codebook $\hat{s}$ using the classical non-uniform quantizer design algorithm with distortion function given by quadratic function of the quantization error as $\in(i;s) = (s - \hat{s}(i))^2$.

The construction of the codebook $\hat{s}$ is generally dependent on the transmit power level. However, as pointed out above the differences between the codebooks $\hat{s}$ for different power regions are quite small. This allows us to create only one codebook $\hat{s}$ and use it for all transmit powers.

C. Quantization of the Transmitter Modulation Matrices

The calculation of the modulation matrix $\hat{B}$ is based on the given codebook $\hat{v}$. We assume that the quantization[32] of the channel eigenmodes is performed at the receiver[24] side and each user transmits[34] back its codebook index $i_k$. The indices are then used at the transmitter side to select[38] [52][62] the modulation matrix $\hat{B}(i_1, i_2, \ldots i_K)$. Since, from the linear transmitter point of view, ordering of the users is not important, we will use the convention that the indices $(i_1, i_2, \ldots i_K)$ are always presented in the ascending order. For example, in a system with K=2, $n_T$=2 and 1-bit vector quantizers $\hat{v}$, there will exist only three possible modulation matrices corresponding to sets of $\hat{v}$ indices (1,1), (1,2) and (2,2).

In the context of vector quantizing, the design of the modulation matrices can no longer be based on the algorithm presented in Section VII.C. Using this method with quantized versions of $h_k$ produces wrong result when identical indices $i_k$ are returned and the receiver[24] attempts to jointly optimize transmission to the users with seemingly identical channel vectors $\hat{h}_k$. Instead, we propose the following algorithm to optimize the set of matrices $\hat{B}(i_1, i_2, \ldots, i_K)$:

1. Create a large set of $Nn_T$ random matrices[46] $H_k$, where N is the number of training sets with $n_T$ users each.
2. For each random matrix $H_k$, perform singular value decomposition[68] and obtain $h_k$[70] as in (15).
3. For each vector $h_k$ store[74] the index $i_k$ of the corresponding entry $\hat{v}(i_k)$.
4. Divide[76] the entire set of matrices $H_k$ into N sets with $n_T$ elements each.
5. Sort[78] the indices $i_k$ within each set l in the ascending order. Map[78] all unique sets of sorted indices to a set of unique indices $I_B$ (for example (1,1)→$I_B$=1; (1,2)→$I_B$=2; (2,2)→$I_B$=3 ...).
6. In each set l, reorder the corresponding channel vectors $h_k$ according to their indices $i_k$ and calculate[80] the optimum $B_l$ using the method from Section VII.C.
7. Calculate[84] a set $\hat{B}(I_B)$ as a column-wise spherical average of all entries $B_l$ corresponding to the same[82] index $I_B$.

After calculation of $|I_B|$ modulation matrices $\hat{B}$, the remaining part of system design is the calculation of the water-filling matrices $\hat{D}$, which divide the powers between the eigenmodes at the transmitter. The procedure for creation of codebook $\hat{D}$[118] is similar to the above algorithm, with the difference that the entries $\hat{s}(n_k)$ are used instead of $\hat{v}(i_k)$, and the spherical averaging of the water-filling matrices is performed diagonally, not column-wise. Explicitly:

1. Create a large set of $Nn_T$ random matrices[46] $H_k$, where N is the number of training sets with $n_T$ users each.
2. For each random matrix $H_k$, perform singular value decomposition[104] and obtain $h_k$ as in (15).
3. For each vector $h_k$ store the index $n_k$ of the corresponding entry $\hat{s}(n_k)$.[106]
4. Divide the entire set of matrices $H_k$ into N sets with $n_T$ elements each. [108]
5. Sort the indices $n_k$ within each set l in the ascending order. Map all unique sets of sorted indices to a set of unique indices $I_D$ (for example (1, 1)→$I_D$=1; (1, 2)→$I_D$=2; (2,2)→$I_D$=3 ...).[110]
6. In each set l, reorder the corresponding channel vectors $h_k$ according to their indices $n_k$ and calculate the optimum $D_l$ using the method of water-filling from Section VII.C.[112]
7. Calculate[116] a set $\hat{D}(I_D)$ as a diagonal spherical average of all entries $D_l$ corresponding to the same[114] index $I_D$.

D. System Operation

The matrices $\hat{B}$ and $\hat{D}$ are used in the actual system in the following way:

1. The K mobile receivers[24] estimate[30],[30A] their channels and send the indices $i_k$[34] and $n_k$[34A] of the corresponding receiver quantizer entries $\hat{v}(i_k)$[32] and $\hat{s}(n_k)$[32A] to the base station.
2. The transmitter forms l sets of users corresponding to all combinations of $n_T$ users out of K. Within each set l, the indices $i_k$[58] and $n_k$[63] are sorted in the ascending order and mapped to their respective indices $I_B(l)$ [60] and $I_D(l)$[64];
3. Within each set l, the matrices $\hat{B}$ [$I_B(l)$][52],[62] and $\hat{D}$ [$I_D(l)$][54],[38A] are used to estimate[56],[66] instantaneous sum-rate R(l).
4. The base station flags the set of users providing highest R(l) as active for the next transmission epoch.
5. The transmitter uses the selected matrices to transmit information.

E. Nested Quantization of Channel Eigenmodes

The above algorithm does not assume any previous knowledge of the channel and the feedback rate required to initially acquire the channel may be high. In order to reduce it on slowly varying channels, we propose a nested quantization method shown in FIGS. 16A and 16B. In this example, an initial coarse quantization of the CSI is performed[88] using only 2 bits. Assuming[98] that the actual channel vector lies in region $v_3$ and that it stays within this region during the transmission of subsequent frames[90], [92],[94], it is possible to further quantize $v_3$ using nested, precise quantization[96]. In this way, the effective feedback rate is still 2 bits, but the resolution corresponds to a 4-bit quantizer. In order to quantify the possibility of such a solution, we introduce eigenmode coherence time $\tau_{eig}(N_v)$, which, related to the frame duration $T_{frame}$, show for how long the channel realization stays within the same region $v_i$ of the $N_v$-bit quantizer. Notice that eigenmode coherence time depends on the number of bits $N_v$: the higher the initial VQ resolution, the faster the channel vector will move to another region and the benefits of nested quantization will vanish.

X. Simulation Results

We have implemented our system using a base station with $n_T$=2 and a set of K mobile receivers[24] with identical statistical properties and $n_R(k)=n_T$=2. We have varied the number of users from 2 to 10 and optimized vector quantizers using methods presented above. Each system setup has been simulated using 10,000 independent channel realizations.

Figure 18:
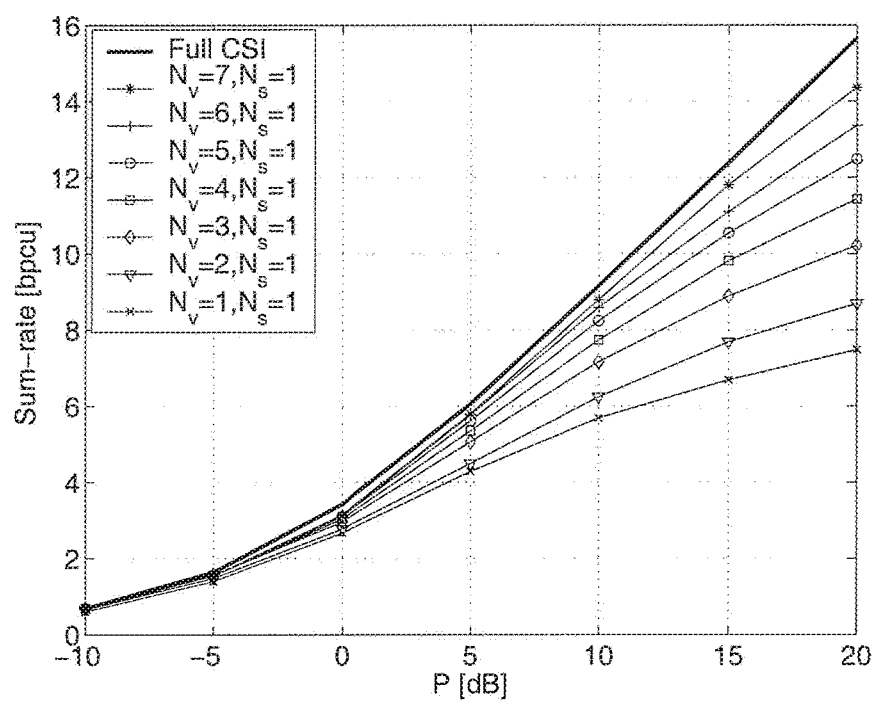
FIG. 18 shows linear system sum-rates with full CSIT and varying feedback bit-rate for K+10. $n_T$=2 and all users with $n_R$=2 antennas.

FIGS. 17 and 18 show the results of the simulations for varying feedback rates. Except for very high transmit power values P>15 dB, it is possible to closely approach the sum-rate of the full CSI system with 8 bits ($N_v$=7, $N_s$=1) in the feedback link. The required feedback rate $N_v$ is much higher than $N_s$, which shows the importance of high quality eigenmode representation in multiuser systems. In high power region, increasing $N_v$ by 1 bit increases the spectral efficiency by approximately 1 bit/channel use.

Figure 19:
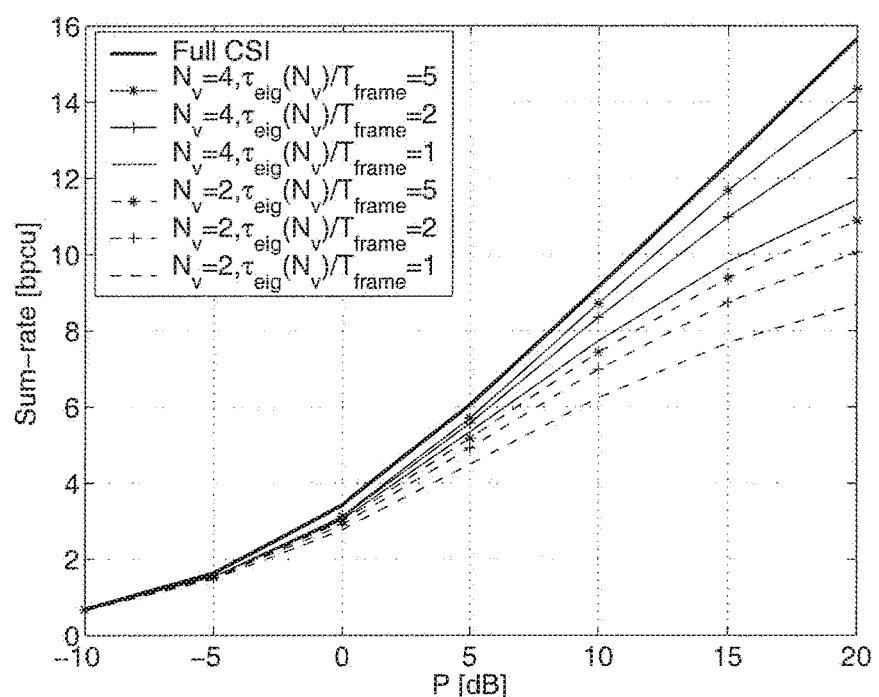
FIG. 19 shows linear system sum-rates with full CSIT and nested CSI quantization with varying eigenmode coherence time $\tau_{eig}(N_v)$. $n_T$=2, K=10, $n_R$=2, $N_s$=1 and $N_v$=2.4.

FIG. 19 shows the results of nested quantization with low feedback rates when the channel's eigenmode coherence time is longer than frame duration. If such a situation occurs, the considered system may approach the theoretical full CSIT sum-rate using only 5 bits per channel use in the feedback link.

Note that further feedback rate reduction can be achieved with the algorithm presented by Jindal. However, we will not present these results here.

XI. Additional Matter

In case of multiple user systems, multi-user diversity may be achieved by a simple time-division multiplexing mode (when only one user at a time is given the full bandwidth of the channel) or scheduling the transmission to multiple users[24] at a time. Here we analyze the former approach and assume that the base station will schedule only one user[24] for transmission.

If the system throughput maximization is the main objective of the system design, the transmitter must be able to estimate[56] the throughput of each of the users, given the codebook indices it received from each of them. Assuming that the kth user returned indices requesting the eigenmode codeword $\hat{V}_k$ and power allocation codeword $\hat{S}_k$, the user's actual throughput is given as $$R_k^{single} = \log_2 \det[I_{n_R(k)} + H_k \hat{V}_k \hat{S}_k \hat{V}_k^H H_k^H] \quad (21)$$

Using singular value decomposition of channel matrix $H_k$ and equality $\det[I_{n_R(k)} + H_k \hat{Q}_k H_k^H] = \det[I_{n_T} + \hat{Q}_k H_k^H H_k]$, it can be shown that $$R_k^{single} = \log_2 \det[I_{n_T} + \hat{V}_k \hat{S}_k \hat{V}_k^H H_k^H H_k] = \log_2 \det[I_{n_R(k)} + \hat{S}_k E_k^H D_k^2 E_k] \quad (22)$$

where $E_k = V_k^H \hat{V}_k$ is a matrix representing the match between the actual eigenmode matrix of the channel and its quantized representation (with perfect match $E_k = I_{n_T}$).

In practice, the actual realization of $E_k$ will not be known at the transmitter, and its mean quantized value $\hat{E}_k$, matched to $\hat{V}_k$ must be used instead. Similarly, the transmitter must use a quantized mean value $\hat{D}_k$, which is matched to the reported water-filling matrix $\hat{S}_k$. This leads to the selection criterion for the optimum user[24] $k_{opt}$ $$k_{opt} = \arg \max_{k=1,2,...K} \log_2 \det[I_{n_R(k)} + \hat{S}_k \hat{E}_k^H \hat{D}_k^2 \hat{E}_k]. \quad (23)$$

Similarly to single-user selection, also in the case of multi-user selection the choice of active users must be made based on incomplete CSIT. The quantized CSI will result in appearance of multi-user interference. We represent this situation using variable $\hat{E}_{k,l} = \hat{v}_k^H [\hat{B}_S]_l$, which models the dot product of the quantized eigenmode $\hat{v}_k^H$ reported by the kth user in the set S, and the lth vector in the selected modulation matrix[52] $\hat{B}_S$.

Moreover, assuming that the quantized singular value of the kth user in the set S is given by $\hat{d}_k$ and the transmitter uses power allocation matrix[54] $\hat{S}_S$, the estimated sum-rate of the subset S is given as[56]

$$R^{multi}(S) = \sum_{k \in S} \log_2 \left( 1 + \frac{P \hat{d}_k^2 [\hat{S}_S]_{k,k} \hat{E}_{k,k}^2}{1 + P \hat{d}_k^2 \sum_{l \neq k} [\hat{S}_S]_{l,l} \hat{E}_{k,l}^2} \right) \quad (24)$$

Note that, due to the finite resolution of the vector quantizer, the multi-user interference will lower the max sum-rate $R^{multi}(S) < R^{max}$ for all S.

Based on (24) the choice of the active set of users is then performed as $$S_{opt} = \arg\max_S R^{vq}(S). \quad (25)$$

One can also modify the algorithm presented in section II.A as follows: we use a simple iterative heuristic based on a modified form of the Lloyd algorithm, which has very good convergence properties. The algorithm starts by creating a random codebook of centroids $\hat{V}$ and iteratively updates it until the mean distortion metric changes become smaller than a given threshold.

The algorithm works as follows:

1. Create a large training set of L random matrices $H_l$.[46]
2. For each random matrix $H_l$, perform singular value decomposition to obtain $V_l$ as in (3).
3. Align orientation of each vector in $V_l$ to lie within the same $2n_T$-dimensional hemisphere.
4. Set iteration counter i=0. Create a set of $2^{N_v}$ random matrices $\hat{H}(n)$.
5. For each matrix $\hat{H}(n)$, calculate corresponding $\hat{V}^{(i)}(n)$ using singular value decomposition.
6. Align orientation of each vector in $\hat{V}^{(i)}(n)$ to lie within the same $2n_T$-dimensional hemisphere.
7. For each training element $H_l$ and codebook entry $\hat{V}^{(i)}(n)$, calculate the metric in (4). For every l, choose the index $n_{opt}(l)$ corresponding to the lowest value of $\gamma v(n;H_l)$. Calculate the subsets $L(n) = \{l : n_{opt}(l) = n\}$ for all n.
8. Calculate new matrix $\hat{V}^{(i+1)}(n)$ as a constrained spherical average $\overline{V}_l^O$ of all entries $V_l$ corresponding to the same index n $$\hat{V}^{(i+1)}(n) = \overline{V}_l^O |_{l \in L(n)} \quad (26)$$

9. For each region n, where cardinality $|L(n)| \neq 0$, calculate the mean eigenmode match matrix $$\hat{E}^{(i+1)}(n) = \frac{1}{|L(n)|} \sum_{l \in L(n)} V_l^H \hat{V}^{(i+1)}(n). \quad (27)$$

10. Calculate the average distortion metric $$\overline{\gamma}_V^{(i+1)} = 1/L \Sigma_l \gamma_V(n_{opt}(l); H_l)$$

11. If the distortion metric fulfills $|\overline{\gamma}_V^{(i+1)} - \overline{\gamma}_V^{(i)}|/\overline{\gamma}_V^{(i)} < \Theta$, where $\Theta$ is a design parameter, stop. Otherwise increase i by 1, and go to 7).

Upon completion of the above algorithm, the final set or vectors $\hat{V}$ can be used to calculate the regions $V_i$ in (5).

The design of the transmitter modulation matrices presented in section IX.C can be modified as follows: we propose the following algorithm to optimize the set of matrices $\hat{B}(i_1, i_2, \ldots i_{n_T})$:

1. Create a large set of $Ln_T$ random matrices $H_l$, where L is the number of training sets with $n_T$ user each.
2. For each random matrix $H_l$, perform singular value decomposition[68] an obtain $h_l$[70] as in (15).
3. Align orientation of each vector $h_l$ to lie within the same $2n_T$-dimensional hemisphere.
4. For each vector $h_l$, store[74] the index $i_l$ of the corresponding entry $\hat{v}(i_l)$.
5. Divide[76] the entire set of matrices $H_l$ into L sets with $n_T$ elements each.
6. Sort[78] the indices $i_l$ within each set in the ascending order, Map[78] all unique sets of sorted eigenmode indices $i_l$ to a set of unique modulation matrix indices $I_B$ (for example, if $n_T = 2$: $(1,1) \to I_B = 1$; $(1,2) \to I_B = 2$; $(2,2) \to I_B = 3 \ldots$).

7. In each set $L(I_B)=\{l:(i_1, i_2, \ldots i_{n_T}) \to I_B\}$, reorder the channel vectors $h_l$ according to the indices $i_j$ and calculated[80] the optimum $B_l$ using the method from Section VII.C.
8. Calculate[84] the set $\hat{B}(I_B)$ as a column-wise spherical average of all entries $B_l$ corresponding to the same[82] index $I_B$ as $$\forall_{n=1,2,\ldots n_T} [\hat{B}(I_B)]_n = \overline{[B_l]_n}^O|_{L(I_B)} \quad (28)$$

After completion of the above algorithm, the transmitter will have the set of $|I_B|$ modulation matrices $\hat{B}(I_B)$ corresponding to all sorted combinations of the channel eigenmode indices that can be reported by the receivers.

To clarify our notation for spherical average used in (26) and (28), we outline a method to calculate a spherical average of a set of unit-length vectors, and a spherical average of a set of unitary matrices, preserving the mutual perpendicularity of the component vectors. We use the notation $\overline{v_l}^O|_{l \in L}$ to represent a spherical average of all unit-length vectors $v_l$ contained in a set L. Based on *Statistical Analysis of Spherical Data* by Fisher et al., we define the spherical average as $$\overline{v_l}^O|_{l \in L} = \min_x \sum_{l \in L} \cos^{-1}(v_l \cdot x) \quad (29)$$

where the unit-length vector x is found using one of the constrained non-linear of optimization algorithms.

In case of the spherical average of a set of unitary matrices, denoted as $\overline{\nabla_l}^O|_{l \in L}$, the averaging of the unit-length column vectors must be performed in a way that the resulting matrix is also unitary. We represent the spherical matrix average as a collection of unit-length vectors $x_l$ as $\overline{\nabla}^O = [x_1, x_2, x_3, \ldots]$ and jointly optimize them as $$\begin{cases} x_k = \min_x \sum_{l \in L} \cos^{-1}([V_l]_k \cdot x), k = 1, 2, 3 \ldots \\ x_k \cdot x_l = 0, k \ne l \end{cases} \quad (30)$$

Immaterial modifications may be made to the embodiments described here without departing from what is covered by the claims.

While illustrative embodiments have been illustrated and described, it will be appreciated that various changes can be made therein without departing from the spirit and scope of the invention.

What is claimed:

1. A method for wireless reception by a user device comprising a multiple-antenna receiver, from a multiple-antenna transmitter, the method comprising:
   storing a codebook including pre-quantized channel vectors each having a length N, wherein N is a number of antennas at the transmitter, and wherein N is greater than 1; and
   in a multi-user multiple input and multiple output (MIMO) mode:
   transmitting one index corresponding to one of the pre-quantized channel vectors to the multiple-antenna transmitter;
   receiving a signal from the multiple-antenna transmitter including data for at least two and no more than N user devices based on the transmitted index; and
   recovering data from the received signal, the data transmitted using the pre-quantized vector corresponding to the index.

2. The method of claim 1, wherein the index is transmitted as channel state information (CSI).

3. The method of claim 1, wherein receiving the signal from the multiple-antenna transmitter comprises receiving orthogonal frequency division multiplexed (OFDM) signals using subcarriers.

4. The method of claim 1, wherein the codebook is used for all transmit powers.

5. The method of claim 1, wherein the codebook further comprises pre-quantized channel matrices, the method further comprising, in a second MIMO mode:
   transmitting a second index corresponding to one of the pre-quantized channel matrices to the multiple-antenna transmitter; and
   receiving a second signal from the multiple-antenna transmitter including second data for at least two and no more than N user devices based on the transmitted second index; and
   recovering second data from the received signal, the data transmitted using the pre-quantized matrix corresponding to the second index.

6. The method of claim 5, wherein the second index is transmitted as channel state information (CSI).

7. The method of claim 5, wherein receiving the second signal from the multiple-antenna transmitter comprises receiving orthogonal frequency division multiplexed (OFDM) signals using subcarriers.

8. A user device comprising:
   a processor;
   a plurality of antennas;
   a transceiver coupled to the processor and the plurality of antennas; and
   a memory coupled to the processor which stores a codebook including pre-quantized channel vectors each having a length N, wherein N is a number of antennas at a multiple-antenna transmitter, and wherein N is greater than 1; and
   wherein the processor, the transceiver, and the plurality of antennas are operable to, in a multi-user multiple input and multiple output (MIMO) mode:
   transmit one index corresponding to one of the pre-quantized channel vectors to the multiple-antenna transmitter;
   receive a signal from the multiple-antenna transmitter including data for at least two and no more than N user devices based on the transmitted index; and
   recover data from the received signal, the data transmitted using the pre-quantized vector corresponding to the index.

9. The user device of claim 8, wherein the index is transmitted as channel state information (CSI).

10. The user device of claim 8, wherein receiving the signal from the multiple-antenna transmitter comprises receiving orthogonal frequency division multiplexed (OFDM) signals using subcarriers.

11. The user device of claim 8, wherein the codebook is used for all transmit powers.

12. The user device of claim 8, wherein the codebook further comprises pre-quantized channel matrices, and the processor, the transceiver, and the plurality of antennas are further operable to, in a second MIMO mode:
   transmit a second index corresponding to one of the pre-quantized channel matrices to the multiple-antenna transmitter; and receive a second signal from the multiple-antenna transmitter including second data for at least two and no more than N user devices based on the transmitted second index; and recover second data from the received signal, the data transmitted using the pre-quantized matrix corresponding to the second index.

13. The user device of claim 12, wherein the second index is transmitted as channel state information (CSI).

14. The user device of claim 12, wherein receiving the second signal from the multiple-antenna transmitter comprises receiving orthogonal frequency division multiplexed (OFDM) signals using subcarriers.

15. A non-transitory computer-readable medium comprising instructions stored thereon which when executed by a processor of a user device operate the user device to:

store a codebook including pre-quantized channel vectors each having a length N, wherein N is a number of antennas at a multiple-antenna transmitter, and wherein N is greater than 1; and in a multi-user multiple input and multiple output (MIMO) mode:

transmit one index corresponding to one of the pre-quantized channel vectors to the multiple-antenna transmitter;

receive a signal from the multiple-antenna transmitter including data for at least two and no more than N user devices based on the transmitted index; and recover data from the received signal, the data transmitted using the pre-quantized vector corresponding to the index.

16. The non-transitory computer-readable medium of claim 15, wherein the index is transmitted as channel state information (CSI).

17. The non-transitory computer-readable medium of claim 15, wherein receiving the signal from the multiple-antenna transmitter comprises receiving orthogonal frequency division multiplexed (OFDM) signals using subcarriers.

18. The non-transitory computer-readable medium of claim 15, wherein the codebook is used for all transmit powers.

19. The non-transitory computer-readable medium of claim 15, wherein the codebook further comprises pre-quantized channel matrices, and the instructions, which when executed by the processor of the user device, further operate the user device to, in a second MIMO mode:

transmit a second index corresponding to one of the pre-quantized channel matrices to the multiple-antenna transmitter; and receive a second signal from the multiple-antenna transmitter including second data for at least two and no more than N user devices based on the transmitted second index; and recover second data from the received signal, the data transmitted using the pre-quantized matrix corresponding to the second index.

20. The non-transitory computer-readable medium of claim 19, wherein the second index is transmitted as channel state information (CSI).

21. The non-transitory computer-readable medium of claim 19, wherein receiving the second signal from the multiple-antenna transmitter comprises receiving orthogonal frequency division multiplexed (OFDM) signals using subcarriers.

* * * * *